United States Patent
Karamichos

(10) Patent No.: US 12,442,827 B2
(45) Date of Patent: Oct. 14, 2025

(54) DETECTION AND TREATMENT OF CONDITIONS RELATED TO LUTEINIZING HORMONE/FOLLICLE-STIMULATING HORMONE (LH/FSH) LEVELS

(71) Applicants: UNIVERSITY OF NORTH TEXAS HEALTH SCIENCE CENTER AT FORT WORTH, Fort Worth, TX (US); THE BOARD OF REGENTS OF THE UNIVERSITY OF OKLAHOMA, Norman, OK (US)

(72) Inventor: Dimitrios Karamichos, Carrollton, TX (US)

(73) Assignees: UNIVERSITY OF NORTH TEXAS HEALTH SCIENCE CENTER AT FORT WORTH, Fort Worth, TX (US); THE BOARD OF REGENTS OF THE UNIVERSITY OF OKLAHOMA, Norman, OK (US)

(*) Notice: Subject to any disclaimer, the term of this patent is extended or adjusted under 35 U.S.C. 154(b) by 804 days.

(21) Appl. No.: 17/775,040

(22) PCT Filed: Nov. 5, 2020

(86) PCT No.: PCT/US2020/059128
§ 371 (c)(1),
(2) Date: May 6, 2022

(87) PCT Pub. No.: WO2021/092187
PCT Pub. Date: May 14, 2021

(65) Prior Publication Data
US 2022/0390474 A1 Dec. 8, 2022

Related U.S. Application Data

(60) Provisional application No. 62/932,099, filed on Nov. 7, 2019.

(51) Int. Cl.
G01N 33/76 (2006.01)

(52) U.S. Cl.
CPC ......... *G01N 33/76* (2013.01); *G01N 2333/59* (2013.01); *G01N 2800/04* (2013.01)

(58) Field of Classification Search
CPC ........ G01N 33/48; G01N 33/74; G01N 33/76; G01N 2333/59; G01N 2800/04; A61K 38/22; A61K 38/09; C07K 14/59; A61P 27/02
USPC ....................... 436/63, 65, 86, 87
See application file for complete search history.

(56) References Cited

U.S. PATENT DOCUMENTS

| | | | |
|---|---|---|---|
| 2002/0058035 A1* | 5/2002 | Garnick | A61P 5/14 514/1 |
| 2009/0208983 A1* | 8/2009 | Nam | G01N 33/54306 422/68.1 |
| 2016/0220302 A1 | 8/2016 | Zarins et al. | |
| 2017/0360843 A1 | 12/2017 | Yuan et al. | |

FOREIGN PATENT DOCUMENTS

WO 2021092187 A1 5/2017

OTHER PUBLICATIONS

Atas, et al. "Comparison of corneal endothelial changes following phacoemulsification with transversal and torsional phacoemulsification machines" Int. J. Ophthalmol. 2014, 7, 822-827.
Burger, et al. "Regulation of gonadotropin subunit gene transcription" J. Mol. Endocrinol. 2004, 33, 559-584.
Chen, et al. "Two forms of gonadotropin-releasing hormone (GnRH) are expressed in human breast tissue and overexpressed in breast cancer: A putative mechanism for the antiproliferative e_ect of GnRH by down-regulation of acidic ribosomal phosphoproteins P1 and P2" Cancer Res. 2002, 62, 1036-1044.
Choi, et al. "Luteinizing hormone and human chorionic gonadotropin: Distinguishing unique physiologic roles" Gynecol. Endocrinol. 2014, 30, 174-181.
George, et al. "Current concepts of follicle-stimulating hormone receptor gene regulation" . Biol. Reprod. 2011, 84, 7-17.
Gipson, et al. "Mucin gene expression in immortalized human corneal-limbal and conjunctival epithelial cell lines" Investig. Ophthalmol. Vis. Sci. 2003, 44, 496-506.
Gokhale, N.S. "Epidemiology of keratoconus" Indian J. Ophthalmol. 2013, 61, 382-383.
Gordon-Shaag, et al. "The genetic and environmental factors for keratoconus" BioMed Res. Int. 2015, 2015, 795738.
Hajagos-Toth, et al. "Obesity in pregnancy: A novel concept on the roles of adipokines in uterine contractility" Croat. Med. J. 2017, 58, 96-104.
Karamichos, et al. "In vitro model suggests oxidative stress involved in keratoconus disease" Sci. Rep. 2014, 4, 4608.
Karamichos, et al. "Novel in Vitro Model for Keratoconus Disease" J. Funct. Biomater. 2012, 3, 760-775.
McCabe, et al. "Generation of Human Embryonic Stem Cell-Derived Corneal Endothelial Cells by Directed Differentiation" PLoS ONE 2015, 10, 0145266.

(Continued)

*Primary Examiner* — Maureen Wallenhorst
(74) *Attorney, Agent, or Firm* — Edwin S. Flores; Daniel J. Chalker; Chalker Flores, LLP

(57) ABSTRACT

Provided herein are methods for detecting or predicting a disease or condition related to a ratio of luteinizing hormone to follicle-stimulating hormone (LH/FSH ratio) by obtaining or having obtained a biological sample from a subject; and determining the LH/FSH ratio in the biological sample, wherein a decrease in the LH/FSH ratio when compared to an age-matched subject that does not have a disease or condition of LH/FSH is indicative of a current or future disease or condition of LH/FSH.

18 Claims, 9 Drawing Sheets

(56) References Cited

OTHER PUBLICATIONS

McKay, et al. "Differential Effects of Hormones on Cellular Metabolism in Keratoconus In Vitro" Sci. Rep. 2017, 7, 42896.
McKay, et al. "Endocrine and Metabolic Pathways Linked to Keratoconus: Implications for the Role of Hormones in the Stromal Microenvironment" Sci. Rep. 2016, 6, 25534.
Mukhtar, et al. "Pediatric keratoconus: A review of the literature" Int. Ophthalmol. 2018, 38, 2257-2266.
Pabon, et al. "Novel presence of luteinizing hormone/chorionic gonadotropin receptors in human adrenal glands" J. Clin. Endocrinol. Metab. 1996, 81, 2397-2400.
Sharif, et al. "Pathogenesis of Keratoconus: The intriguing therapeutic potential of Prolactin-inducible protein" . Prog. Retinal Eye Res. 2018, 67, 150-167.
Sharif, et al. "Prolactin-Induced Protein is a novel biomarker for Keratoconus" Exp. Eye Res. 2019, 179, 55-63.
Shemesh, M. "Actions of gonadotrophins on the uterus" Reproduction 2001, 121, 835-842.
Stamatiades, et al. "Gonadotropin regulation by pulsatile GnRH: Signaling and gene expression" Mol. Cell. Endocrinol. 2018, 463, 131-141.
Suzuki, et al. "Expression of sex steroid hormone receptors in human cornea" Curr. Eye Res. 2001, 22, 28-33.
Thanos, et al. "Role of Thyroxine in the Development of Keratoconus" Cornea 2016, 35, 1338-1346.
Ulloa-Aguirre, et al. "FSH Receptor Signaling: Complexity of Interactions and Signal Diversity" Endocrinology 2018, 159, 3020-3035.
Varssano, et al. "Topographic patterns in refractive surgery candidates" Cornea 2004, 23, 602-607.
Versura, et al. " Sex-steroid imbalance in females and dry eye" Curr. Eye Res. 2015, 40, 162-175.
Wallace, et al. "The changing role of the clinical laboratory in the investigation of polycystic ovarian syndrome" Clin. Biochem. Rev. 2007, 28, 79-92.
Yu, et al. "Differences between human plasma and serum metabolite profiles" . PLoS ONE 2011, 6, e21230.
United States Patent & Trademark Office, International Search Report and Written Opinion for PCT/US2020/059128 dated Feb. 9, 2021.
Karamichos et al. "Gonadotropins in Keratoconus: The Unexpected Suspects," Cells, 22 Nov. 1-31, 2019 (Nov. 22, 2019), vol. 8, No. 1494, pp. 1-13. entire document.
Karamichos et al. "Gonadotropins: A new concept in keratoconus," IOVS, Jun. 1, 2020 1-31 (Jun. 1, 2020), vol. 61, No. 4370, p. 1 of 1. entire document.
Javed et al. "Hyperandrogenism in female athletes with functional hypothalamic amenorrhea: a 1-31 distinct phenotype," Int J Womens Health, Jan. 13, 2015 (Jan. 13, 2015), vol. 7, pp. 103-111. entire document.
Lewandowski et al. "The utility of the gonadotrophin releasing hormone (GnRH) test in the 1-31 diagnosis of polycystic ovary syndrome (PCOS)," Endokrynol Pol, Apr. 29, 2011 (Apr. 29, 2011), vol. 62, pp. 120-128. entire document.

\* cited by examiner

DETECTION AND TREATMENT OF CONDITIONS RELATED TO LUTEINIZING HORMONE/FOLLICLE-STIMULATING HORMONE (LH/FSH) LEVELS

CROSS-REFERENCE TO RELATED APPLICATIONS

This application is a National Stage of International Application No. PCT/US2020/059128, filed Nov. 5, 2020, claiming the priority of U.S. Application No. 62/932,099, filed Nov. 7, 2019. The contents of each of which are incorporated by reference in their entirety.

STATEMENT OF FEDERALLY FUNDED RESEARCH

This invention was made with government support under U.S. National Eye Institute (NEI)/National Institutes of Health (NIH), grant number EY028888. The government has certain rights in the invention.

TECHNICAL FIELD OF THE INVENTION

The present invention relates in general to the field of the detection and treatment of diseases or conditions related to luteinizing hormone/follicle-stimulating hormone (LH/FSH) levels.

INCORPORATION-BY-REFERENCE OF MATERIALS FILED ON COMPACT DISC

None.

BACKGROUND OF THE INVENTION

Without limiting the scope of the invention, its background is described in connection with diseases and conditions of the eye.

Keratoconus (KC) is a complex, multifactorial, corneal disease that remains a mystery, in the context of its onset, rate of progression, and the underlying pathobiology. Progressive ectasia, corneal thinning, and scarring are the hallmarks of KC, known to affect both males and females. Prevalence has been increasing steadily, going from 1:2000 back in the 1980s to 1:350 in the 2000s worldwide, perhaps due to technological advancements and better diagnostics. Hunting for an etiology for the appearance and progression of KC, studies have reported various contributing factors, including: genetics, environmental conditions, eye rubbing, and hormonal imbalances.

The idea that sex hormones might play a role in KC is not new. Estrogen and androgen receptors are present in the human cornea, though their role is uncertain. The role of sex hormones in causing changes in the cornea during pregnancy has long been documented, as hormonal fluctuations result in corneal alterations including increases in corneal volume, central corneal thickness, and curvature. Due to these hormonal changes, progression in KC has been documented in pregnant women during pregnancy and beyond, extending to six months postpartum. Therefore, understanding the mechanisms of hormonal regulation in KC is fundamental to determining dysfunction, and can directly affect people's lives.

The pituitary gland is responsible for secretion of various endocrine signaling hormones with the anterior pituitary producing the follicle-stimulating hormone (FSH) and luteinizing hormone (LH), that ultimately control the sex hormones (androgens and estrogens). FSH is a gonadotropin, glycoprotein polypeptide hormone synthesized and secreted by the gonadotropic cells of the anterior pituitary gland. FSH is known to regulate the development, growth, pubertal maturation, and reproductive processes of the human body. LH is also produced by gonadotropic cells in the anterior pituitary gland. In females, LH triggers ovulation and development of the corpus luteum, whereas in males, LH stimulates Leydig cell production of testosterone. Both FSH and LH are vital endocrine hormones, and their involvement in KC has never been investigated.

Despite these observations, a need remains for the development of diagnostics, biomarkers, and treatment for conditions related to luteinizing hormone/follicle-stimulating hormone (LH/FSH) levels, for example, Keratoconus.

SUMMARY OF THE INVENTION

In one embodiment, the present invention includes a method for detecting or predicting a disease or condition related to a ratio of luteinizing hormone to follicle-stimulating hormone (LH/FSH ratio) comprising: obtaining or having obtained a biological sample from a subject; and determining the LH/FSH ratio in the biological sample, wherein a decrease in the LH/FSH ratio when compared to an age-matched subject that does not have a disease or condition of LH/FSH is indicative of a current or future disease or condition of LH/FSH. In one aspect, the disease or condition is a disease or condition of the eye. In another aspect, the disease or condition is Keratoconus. In another aspect, the disease or condition is selected from at least one of: Premature Ovarian Failure, Premature Ovarian Aging, Gonadal dysgenesis, Turner syndrome, Swyer syndrome, congenital adrenal hyperplasia, Testicular failure, Klinefelter syndrome, Systemic Lupus Erythematosus, Polycystic Ovarian Syndrome with Obesity and Hirsutism and Infertility, Kallmann syndrome, Hypothalamic suppression, Hypopituitarism, Pasqualini syndrome, Eating disorders, and Female athlete triad. In another aspect, a first biological sample is obtained at a first time that is before, during, or after puberty, and a second biological sample is obtained at a second time after the first time, wherein a decrease in the LH/FSH ratio between the first and second time is predictive of Keratoconus when the second sample is obtained prior to symptoms of Keratoconus. In another aspect, the biological sample is a blood-plasma, tear, intravitreal, blood-serum, hair, urine, aqueous humor, saliva or sweat sample. In another aspect, the disease is Keratoconus and a severity of Keratoconus is determined by measuring a decrease in the LH/FSH ratio for Keratoconus levels KC-1, KC-2, KC-3 and KC-4. In another aspect, the method further comprises the detection of DHEA-S in the biological sample, wherein an increase in DHEA-S is indicative of Keratoconus. In another aspect, the method further comprises the detection of at least one of estrone, estriol, or gonadotropin-releasing hormone, wherein a decrease of estrone, estriol, gonadotropin-releasing hormone, or combinations thereof, is indicative of Keratoconus. In another aspect, the subject can be treated with PIP provided in an amount of 0.1 ng/ml to 1 mg/ml. In another aspect, the subject can be treated with GNRH provided in an amount of 0.1 pg/ml to 1 mg/ml.

In another embodiment, the present invention includes a method of determining or predicting if a subject will develop a disease or condition related to a ratio of luteinizing hormone to follicle-stimulating hormone (LH/FSH ratio) the subject, comprising: obtaining or having obtained a biological sample from the subject; determining a level of expression or LH and FSH in the biological sample; calculating the LH/FSH ratio in the biological sample; and determining if there is a decrease in the LH/FSH ratio when compared to an age-matched subject that does not have a disease or condition, wherein a decrease in the LH/FSH ratio is indicative of a current or future disease or condition of LH/FSH in need of treatment. In one aspect, the disease or condition of LH/FSH is a disease or condition of the eye. In another aspect, the disease or condition is Keratoconus. In another aspect, the disease or condition is selected from at least one of: Premature Ovarian Failure, Premature Ovarian Aging, Gonadal dysgenesis, Turner syndrome, Swyer syndrome, congenital adrenal hyperplasia, Testicular failure, Klinefelter syndrome, Systemic Lupus Erythematosus, Polycystic Ovarian Syndrome with Obesity and Hirsutism and Infertility, Kallmann syndrome, Hypothalamic suppression, Hypopituitarism, Pasqualini syndrome, Eating disorders, and Female athlete triad. In another aspect, a first biological sample is obtained at a first time that is before, during, or after puberty, and a second biological sample is obtained at a second time after the first time, wherein a decrease in the ratio of LH/FSH between the first and second time is predictive Keratoconus, and the second sample is obtained prior to symptoms of Keratoconus. In another aspect, the biological sample is a blood, plasma, tear, intravitreal, blood-serum, hair, urine, aqueous humor, saliva or sweat sample. In another aspect, the disease is a Keratoconus, and a severity of Keratoconus is determined by measuring a decrease in the LH/FSH ratio for Keratoconus levels KC-1, KC-2, KC-3 and KC-4. In another aspect, the method further comprises the detection of DHEA-S, wherein an increase in DHEA-S is indicative of Keratoconus. In another aspect, the method further comprises the detection of at least one of estrone, estriol, or gonadotropin-releasing hormone, wherein and a decrease of estrone, estriol, gonadotropin-releasing hormone, or combination thereof is indicative of Keratoconus. In another aspect, the method further comprises the step of providing the subject with an amount of Gonadotropes, pituitary hormones, Gonadotropin-releasing hormones, LH, FSH, DHEA-S, Estrone, Estriol, or sex hormones effective to treat the disease or condition. In another aspect, the subject can be treated with PIP provided in an amount of 0.1 ng/ml to 1 mg/ml. In another aspect, the subject can be treated with GNRH provided in an amount of 0.1 pg/ml to 1 mg/ml.

A method for treating a patient with a disease or condition related to a ratio of luteinizing hormone of follicle-stimulating hormone (LH/FSH ratio), the method comprising the steps of: performing or having performed a determination of the LH/FSH ratio in a biological sample obtained from a patient suspected of having a disease or condition related to LH/FSH levels; and if the patient has a LH/FSH ratio that is lower that the LH/FSH ratio in subject that does not have the disease or condition related to LH/FSH levels, then treating the patient with at least one of: Gonadotropes, pituitary hormones, Gonadotropin-releasing hormones, LH, FSH, DHEA-S, Estrone, Estriol, sex hormones, Prolactin-Inducible Protein (PIP) fragment, or variant thereof, or Gonadotropin-releasing hormone (GNRH), fragment, or variant thereof in an amount sufficient to increase the LH/FSH ratio. In one aspect, the GNRH is provided in an amount to reduce or eliminate the Keratoconus. In another aspect, the disease or condition of LH/FSH is a disease or condition of the eye. In another aspect, the disease or condition is Keratoconus. In another aspect, the disease or condition is selected from at least one of: Premature Ovarian Failure, Premature Ovarian Aging, Gonadal dysgenesis, Turner syndrome, Swyer syndrome, congenital adrenal hyperplasia, Testicular failure, Klinefelter syndrome, Systemic Lupus Erythematosus, Polycystic Ovarian Syndrome with Obesity and Hirsutism and Infertility, Kallmann syndrome, Hypothalamic suppression, Hypopituitarism, Pasqualini syndrome, Eating disorders, and Female athlete triad. In another aspect, the subject can be treated with PIP provided in an amount of 0.1 ng/ml to 1 mg/ml. In another aspect, the subject can be treated with GNRH provided in an amount of 0.1 pg/ml to 1 mg/ml.

A method of determining, predicting, or treating a patient with Keratoconus comprising: obtaining a sample of corneal stromal cells from a patient suspected of having Keratoconus; determining the level of expression of luteinizing hormone receptor (LHR), follicle stimulating hormone receptor (FSHR), or both, wherein an increase in LHR, or a decrease of FHSR, or both, is indicative of Keratoconus; and treating the patient with an amount of a hormone or peptide sufficient to reduce the symptoms or treat the Keratoconus. In one aspect, the patient is treated with Prolactin-Inducible Protein (PIP) or a Gonadotropin-releasing hormone (GNRH) in an amount sufficient to treat the Keratoconus. In another aspect, the subject can be treated with PIP provided in an amount of 0.1 ng/ml to 1 mg/ml. In another aspect, the subject can be treated with GNRH provided in an amount of 0.1 pg/ml to 1 mg/ml. In one aspect, the composition is formulated for topical, ophthalmic, topical administration, into the conjunctival sac, intravitreal, subconjunctival, retrobulbar, intracameral, or sub-Tenon's administration.

BRIEF DESCRIPTION OF THE DRAWINGS

For a more complete understanding of the features and advantages of the present invention, reference is now made to the detailed description of the invention along with the accompanying figures and in which:

FIG. 1A) Overall levels for both LH and FSH, and FIG. 1B) LH/FSH ratio in Healthy and KCs. *$p<0.05$, $p<0.01$, *$p<0.001$.

FIG. 2A) Healthy Male (n=22), Healthy Female (n=25), KC Male (n=63) and KC Female (n=23) LH levels, FIG. 2B) Healthy Male (n=22), Healthy Female (n=25), KC Male (n=63) and KC Female (n=23) FSH levels, and FIG. 2C) the Male and Female LH/FSH ratio, in Healthy and KCs. *$p<0.05$, $p<0.01$, **$p<0.0001$.

FIG. 3A) LH levels in Heathy and KCs, per age group, FIG. 3B) FSH levels in Healthy and KCs, per age group, and FIG. 3C) LH/FSH ratio in Healthy and KCs, per age group. *$p<0.05$, **$p<0.01$.

Figure 5A:
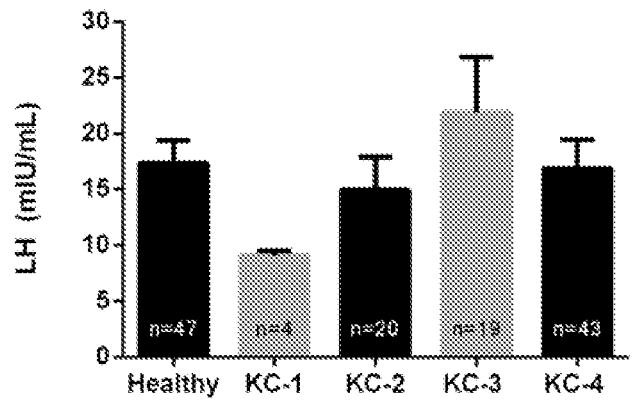
Figure 5B:
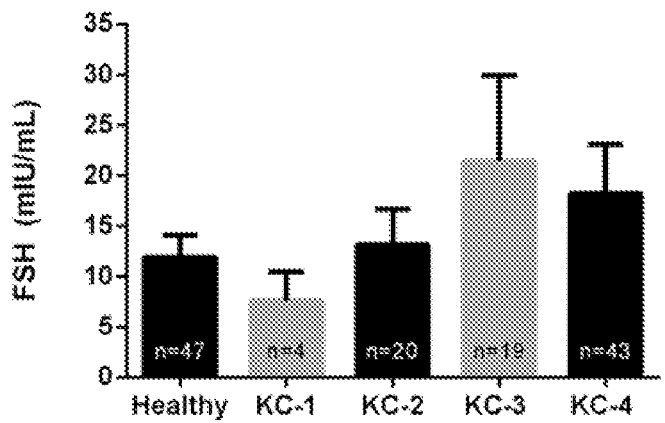
Figure 5C:
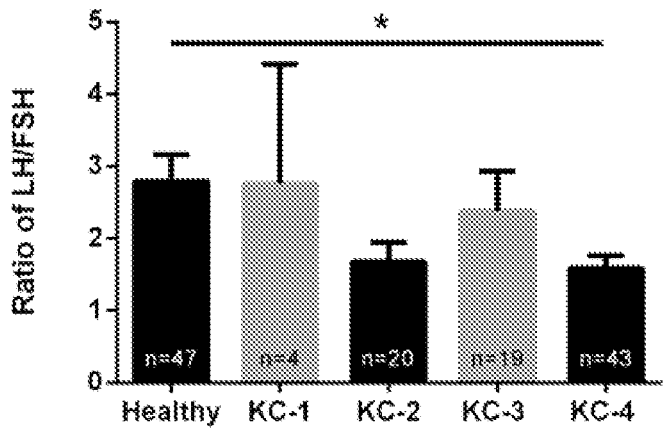

FIGS. 5A to 5C show severity-dependent expression of LH, FSH, and LH/FSH ratio in Healthy (n=47) and KC (n=86) blood (plasma) samples. Severity grades were defined based on the Kmax: KC-1 (n=4), KC-2 (n=20), KC-3 (n=19) and KC-4 (n=43). FIG. 5A) LH levels in Healthy and KCs, across all severities, FIG. 5B) FSH levels in Healthy and KCs, across all severities, and FIG. 5C) LH/FSH ratio in Healthy and KCs, across all severities. *$p<0.05$.

Figure 6A:
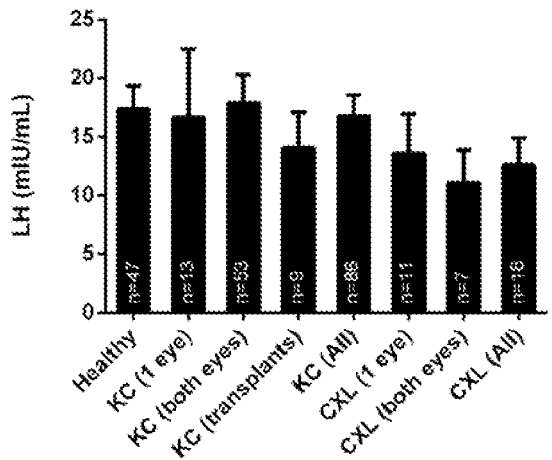
Figure 6B:
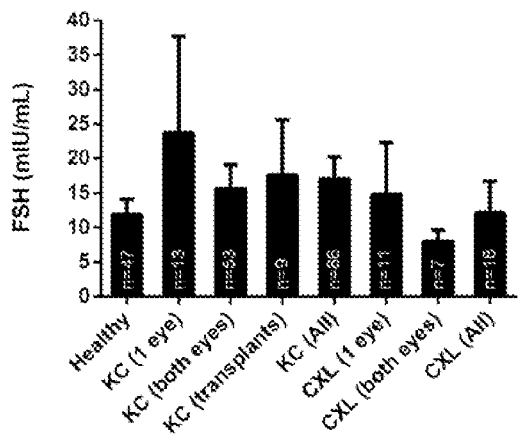
Figure 6C:
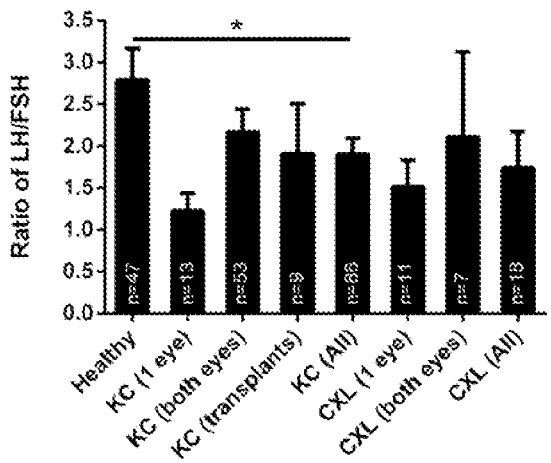

FIGS. 6A to 6C show expression of LH, FSH, and LH/FSH ratio in Healthy (n=47) and KC (n=86) blood (plasma) samples. Seven different groups were compared: 1) KC on one eye (n=13), 2) KC on both eyes (n=53), 3) KCs with corneal transplants (n=9), 4) All KCs independent of treatment(s) (n=86), 5) KCs with collagen crosslinking on one eye (n=11), and 6) KCs with collagen crosslinking on both eyes (n=7), and 7) All KCs with collagen crosslinking treatment, independent of the number of eyes (n=18). FIG. 6A) LH levels, FIG. 6B) FSH levels, and FIG. 6C) LH/FSH ratio. *$p<0.05$.

Figure 7A:
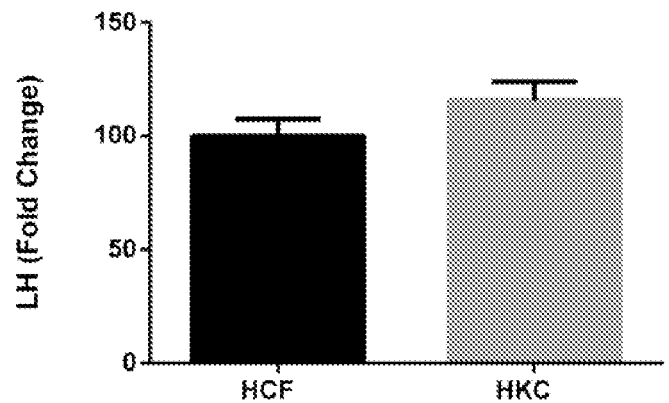
Figure 7B:
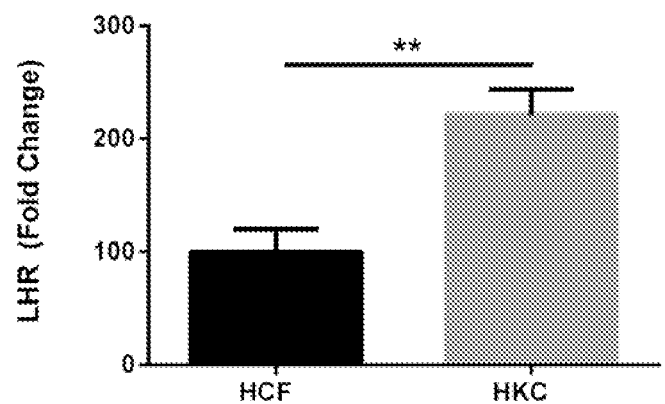
Figure 7C:
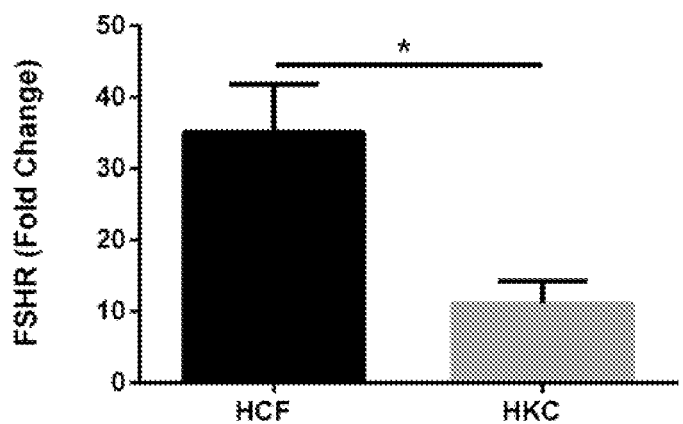

FIGS. 7A to 7C show expression of LH, LHR, and FSHR in HCFs and HKCs. FIG. 7A) LH expression in vitro, FIG. 7B) LHR expression in vitro, and FIG. 7C) FSHR expression in vitro. *$p<0.05$, **$p<0.01$.

Figure 8:
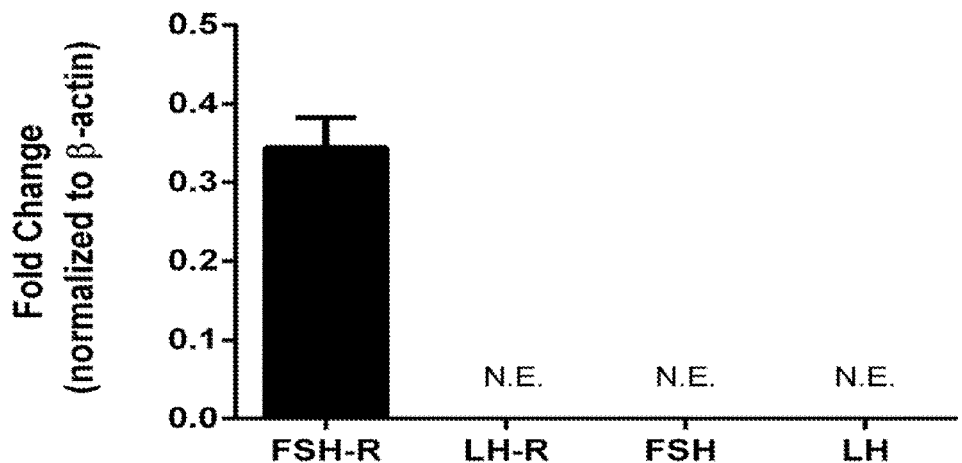

FIG. 8 shows expression of FSHR, LHR, FSH, and LH in human corneal epithelial cells. FSHR was the only one expressed by the epithelial cells.

Figure 9A:
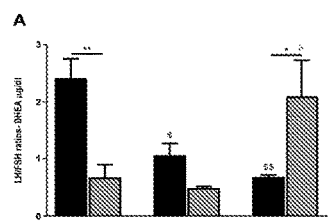
Figure 9B:
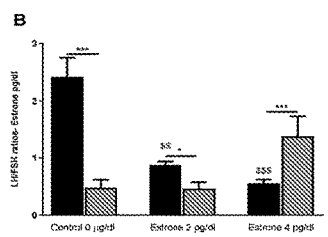
Figure 9C:
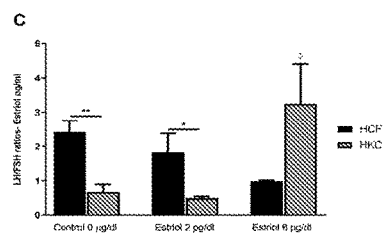

FIGS. 9A to 9C show that the LH/FSH ratio was modulated in vitro by DHEA, Estrone, and Estriol stimulation. Note that HKCs are "recovering" towards a healthy phenotype, whereas HCFs are moving towards a disease-phenotype. HKCs are cells from Keratoconus patients. HCFs are cells from Healthy individuals.

Figure 10A:
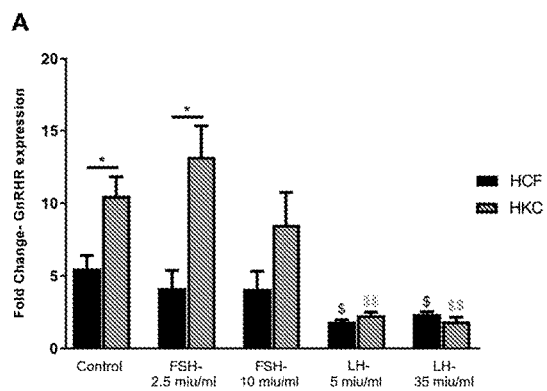
Figure 10B:
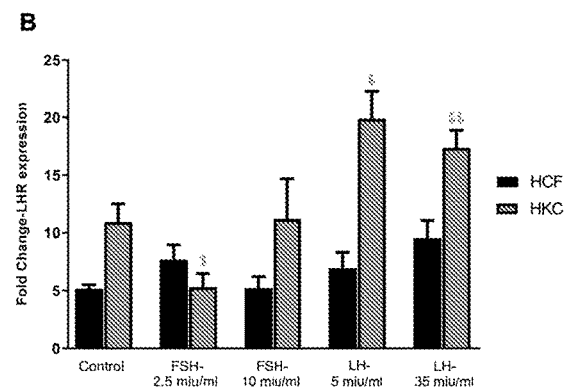

FIGS. 10A and 10B show that the GnRH-Receptor is modulated by both FSH and LH stimulation, in a dose dependent manner.

Figure 11A:
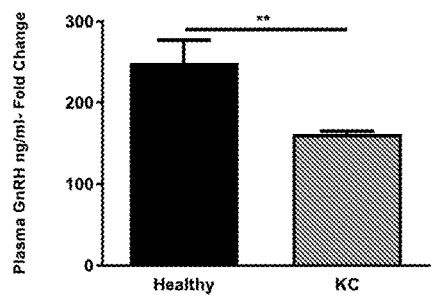
Figure 11B:
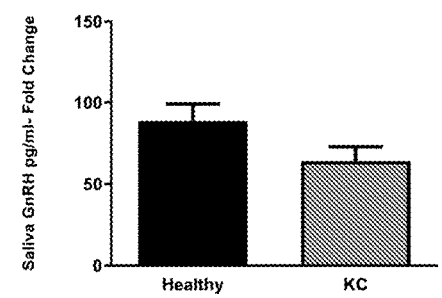

FIGS. 11A and 11B show GnRH expression in a small age-matched cohort that included 20 KC and 20 Healthy individuals. In blood (plasma; FIG. 11A) the GnRH expression was significantly lower in KCs, when compared to their healthy counterparts. GnRH expression in KC saliva, from the same cohort, was downregulated compared to healthy individuals.

Figure 12:
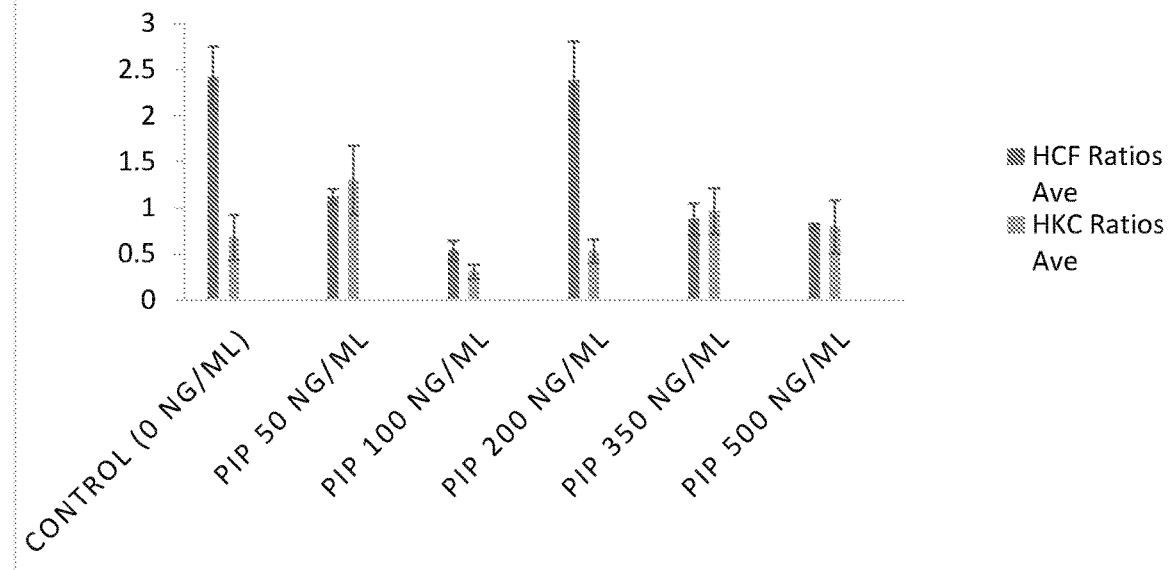

FIG. 12 shows that the LH/FSH ratio is modulated by PIP, in a concentration dependent manner in both Healthy and KC cells.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity but include the general class of which a specific example may be used for illustration. The terminology herein is used to describe specific embodiments of the invention, but their usage does not delimit the invention, except as outlined in the claims.

Hunting for an etiology for the appearance and progression of KC, studies have been reporting a slew of contributing factors including genetics, environmental conditions, eye rubbing, and hormonal imbalances. Recently, the inventors focused on hormonal imbalances and their role on KC. The present inventors reported significant changes in androgens and estrogens in KC patients, when compared to healthy subjects. The inventors also found significant upregulation of dehydroepiandrosterone sulfate (DHEA-S), while estrone and estriol were downregulated in plasma and saliva samples, from KC patients. Surprisingly, these changes were apparent independent of age, gender, or severity of KC. In the same cohort of KCs, the inventors discovered that a hormonally regulated protein, Prolactin-Induced Protein, a.k.a. Prolactin-Inducible Protein, (PIP), a 17-kDa glycoprotein, was significantly downregulated in all KCs leading us to believe that PIP is a strong KC biomarker and a measurable indicator of KC. However, the signaling mechanisms about how hormonal imbalances and PIP can tell the KC story are unknown. So, how can hormonal imbalances explain the large geographic variability, the gender dominance inconsistencies, or the unpredictable rate of progression? The current study sought to investigate and delineate the mechanisms underlying hormonal imbalances in KCs.

The present disclosure is directed to treating subjects who have or are predisposed to LH/FSH-related diseases by administering Prolactin-Induced Protein to the subject to modulate (particularly to upregulate) the LH/FSH ratio. For example, in at least one embodiment, the present disclosure is directed to a method for treating an LH/FSH-related disease or condition in a subject by administering Prolactin-Induced Protein to the subject to increase a circulating LH/FSH ratio in the subject. More particularly, the treatment may be for inhibiting KC in subjects predisposed to KC, or for inhibiting progression of KC in subjects having the condition.

In the present work, levels and modulation of LH/FSH in KC patients were investigated, both systemically and within the corneal microenvironment (i.e., cellular level). Results demonstrated significant modulation of LH and FSH levels in KCs, when compared to their healthy counterparts, in vivo, indicating a systemic component that up until now has remained unexplored. Furthermore, expression of LH, as well as the LH/FSH receptors, by the human corneal stromal cells and the FSH receptor by the human corneal epithelial cells, in vitro was detected. These novel findings qualify the human cornea, for the first time ever, as an extragonadal tissue and place it in the same category as previously identified tissues such as skin, breast, uterus, and adrenals.

LH/FSH-related diseases and conditions that can be treated include, but are not limited to: Premature menopause also known as Premature Ovarian Failure, Poor ovarian reserve also known as Premature Ovarian Aging, Gonadal dysgenesis, Turner syndrome, Castration, Swyer syndrome, congenital adrenal hyperplasia, Testicular failure, Klinefelter syndrome, Systemic Lupus Erythematosus also known as Lupus, Polycystic Ovarian Syndrome with Obesity and Hirsutism and Infertility, Kallmann syndrome, Hypothalamic suppression, Hypopituitarism, Hyperprolactinemia, Gonadotropin deficiency, Pasqualini syndrome, Eating disorders, and Female athlete triad.

In a particular embodiment related to Keratoconus, based on the present findings, a new concept for the onset of KC is taught: KC is a systemic disease initiated by hormonal imbalances regulated by the anterior pituitary at very early ages (if not at birth) and manifests around puberty due to the long-term exposure of the cornea to these imbalances.

Definitions

As used herein, the terms "mutant" or "variant" refer to a protein, peptide, nucleic acid or organism which has at least one amino acid or nucleotide which is different from the wild type version of the protein, peptide, nucleic acid, or organism and includes, but is not limited to, point substitutions, multiple contiguous or non-contiguous substitutions, chimeras, or fusion proteins, and the nucleic acids which encode them. Examples of conservative amino acid substitutions include, but are not limited to, substitutions made within the same group such as within the group of basic amino acids (such as arginine, lysine, histidine), acidic amino acids (such as glutamic acid and aspartic acid), polar amino acids (such as glutamine and asparagine), hydrophobic amino acids (such as leucine, isoleucine, and valine), aromatic amino acids (such as phenylalanine, tryptophan, tyrosine) and small amino acids (such as glycine, alanine, serine, threonine, methionine). Other examples of possible substitutions are described below.

As used herein, the term "pharmaceutically acceptable" refers to compounds and compositions which are suitable for administration to humans and/or animals without undue adverse side effects such as toxicity, irritation and/or allergic response commensurate with a reasonable benefit/risk ratio.

As used herein, the "biologically active" refers to the ability to modify the physiological system of an organism without reference to how the active agent has its physiological effects.

As used herein, "pure," or "substantially pure" refers to a predominant species present, i.e., on a molar basis it is more abundant than any other object species in the composition thereof, and particularly a substantially purified fraction is a composition wherein the object species comprises at least about 50 percent (on a molar basis) of all macromolecular species present. Generally, a substantially pure composition will comprise more than about 80% of all macromolecular species present in the composition, more particularly more than about 85%, more than about 90%, more than about 95%, or more than about 99%. The term "pure" or "substantially pure" also refers to preparations where the object species (e.g., the active agent) is at least 60% (w/w) pure, or at least 70% (w/w) pure, or at least 75% (w/w) pure, or at least 80% (w/w) pure, or at least 85% (w/w) pure, or at least 90% (w/w) pure, or at least 92% (w/w) pure, or at least 95% (w/w) pure, or at least 96% (w/w) pure, or at least 97% (w/w) pure, or at least 98% (w/w) pure, or at least 99% (w/w) pure, or 100% (w/w) pure.

As used herein, the terms "subject" and "patient" are used interchangeably herein and refer to a warm blooded animal, particularly a mammal. Non-limiting examples of animals within the scope and meaning of this term include dogs, cats, rabbits, rats, mice, guinea pigs, chinchillas, hamsters, ferrets, horses, pigs, goats, cattle, sheep, zoo animals, camels, llamas, non-human primates, including Old and New World monkeys and non-human primates (e.g., cynomolgus macaques, chimpanzees, rhesus monkeys, orangutans, and baboons), and humans.

As used herein, the term "active agent" refers to a compound or composition having biological activity.

As used herein, the term "treatment" refers to therapeutic treatments.

As used herein, the term "prevention" refers to prophylactic or preventative treatment measures. The term "treating" refers to administering the composition to a patient for therapeutic purposes.

As used herein, the terms "therapeutic composition" and "pharmaceutical composition" refer to an active agent-containing composition that may be administered to a subject by any method known in the art or otherwise contemplated herein, wherein administration of the composition brings about a therapeutic effect as described elsewhere herein. In addition, the compositions of the present disclosure may be designed to provide delayed, controlled, extended, and/or sustained release using formulation techniques which are well known in the art.

As used herein, the term "effective amount" refers to an amount of an active agent which is sufficient to exhibit a detectable therapeutic effect without excessive adverse side effects (such as toxicity, irritation and allergic response) commensurate with a reasonable benefit/risk ratio when used in the manner of the inventive concepts. The effective amount for a patient will depend upon the type of patient, the patient's size and health, the nature and severity of the condition to be treated, the method of administration, the duration of treatment, the nature of concurrent therapy (if any), the specific formulations employed, and the like. Thus, it is not possible to specify an exact effective amount in advance. However, the effective amount for a given situation can be determined by one of ordinary skill in the art using routine experimentation based on the information provided herein.

As used herein, the term "ameliorate" refers to a detectable or measurable improvement in a subject's condition, disease or symptom thereof. A detectable or measurable improvement includes a subjective or objective decrease, reduction, inhibition, suppression, limit or control in the occurrence, frequency, severity, progression, or duration of the condition or disease, or an improvement in a symptom or an underlying cause or a consequence of the disease, or a reversal of the disease. A successful treatment outcome can lead to a "therapeutic effect," or "benefit" of ameliorating, decreasing, reducing, inhibiting, suppressing, limiting, controlling or preventing the occurrence, frequency, severity, progression, or duration of a disease or condition, or consequences of the disease or condition in a subject.

A decrease or reduction in worsening, such as stabilizing the condition or disease, is also a successful treatment outcome. A therapeutic benefit therefore need not be complete ablation or reversal of the disease or condition, or any one, most or all adverse symptoms, complications, consequences or underlying causes associated with the disease or condition. Thus, a satisfactory endpoint may be achieved when there is an incremental improvement such as a partial decrease, reduction, inhibition, suppression, limit, control, or prevention in the occurrence, frequency, severity, progression, or duration, or inhibition or reversal of the condition or disease (e.g., stabilizing), over a short or long duration of time (hours, days, weeks, months, etc.). Effectiveness of a method or use, such as a treatment that provides a potential therapeutic benefit or improvement of a condition or disease, can be ascertained by various methods and testing assays.

As used herein, the term "active agent(s)" refer(s) to pharmaceutical compositions (alone or in combination) at any concentration that allows the pharmaceutical composition to function in accordance with the present disclosure; for example, but not by way of limitation, the compound(s) may be present in a range having a lower level selected from 0.00001%, 0.0001%, 0.005%, 0.001%, 0.005%, 0.01%, 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9% and 2.0%; and an upper level selected from 3%, 3.5%, 4%, 4.5%, 5%, 5.5%, 6%, 6.5%, 7%, 7.5%, 8%, 8.5%, 9%, 9.5%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 85%, 90%, and 95%. Non-limiting examples of particular ranges include a range of from about 0.0001% to about 95%, a range of from about 0.001% to about 75%; a range of from about 0.005% to about 50%; a range of from about 0.01% to about 40%; a range of from about 0.05% to about 35%; a range of from about 0.1% to about 30%; a range of from about 0.1% to about 25%; a range of from about 0.1% to about 20%; a range of from about 1% to about 15%; a range of from about 2% to about 12%; a range of from about 5% to about 10%; and the like. Any other range that includes a lower level selected from the above-listed lower level concentrations and an upper level selected from the above-listed upper level concentrations also falls within the scope of the present disclosure. Percentages used herein may be weight percentages (wt %).

In certain non-limiting embodiments, an effective amount or therapeutic dosage of a pharmaceutical composition of the present disclosure contains, sufficient active agent to deliver from about 0.001 μg/kg to about 100 mg/kg (weight of active agent/body weight of the subject). For example, the composition will deliver about 0.01 μg/kg to about 50 mg/kg, and more particularly about 0.1 μg/kg to about 10 mg/kg, and more particularly about 1 μg/kg to about 1 mg/kg. Practice of a method of the present disclosure may comprise administering to a subject an effective amount of the active agent in any suitable systemic and/or local formulation, in an amount effective to deliver the therapeutic dosage of the active agent. In certain embodiments, an effective dosage may be, in a range of about 1 μg/kg to about 1 mg/kg of the active agent.

In certain non-limiting embodiments, an effective amount or therapeutic dosage of a pharmaceutical composition of the present disclosure contains PIP in a concentration in a range of 0.01 micromolar to 1000 millimolar. In certain non-limiting embodiments, an effective amount or therapeutic dosage of a pharmaceutical composition of the present disclosure contains PIP in a concentration in a range of 0.01 micromolar to 500 millimolar. In certain non-limiting embodiments, an effective amount or therapeutic dosage of a pharmaceutical composition of the present disclosure contains PIP in a concentration in a range of 0.01 micromolar to 100 millimolar.

Practice of the methods of the present disclosure may comprise administering to a subject a therapeutically effective amount of the active agent in any suitable systemic and/or local formulation, in an amount effective to deliver the dosages listed herein. The dosage can be administered, for example but not by way of limitation, on a one-time basis, or administered at multiple times (for example but not by way of limitation, from one to five times per day, or once or twice per week), or continuously via a venous drip, depending on the desired therapeutic effect. In one non-limiting example of a therapeutic method of the present disclosure, the active agent is provided in an IV infusion in the range of from about 0.01 mg/kg to about 10 mg/kg of body weight once a day.

The active agents of the combination therapies of the present disclosure may be administered together or separately, e.g., immediately in succession, or separated by a suitable duration of time, as long as the active agents function together in a synergistic manner.

Administration of the active agents used in the pharmaceutical composition or to practice the methods of the present disclosure can be carried out in a variety of conventional ways, such as, but not limited to, orally, by inhalation, rectally, topically, nasally, or by cutaneous, subcutaneous, intraperitoneal, vaginal, or intravenous injection. Oral formulations may be formulated such that the active agents pass through a portion of the digestive system before being released, for example it may not be released until reaching the small intestine, or the colon.

When an effective amount of the active agents is administered orally, it may be in the form of a solid or liquid preparation such as capsules, pills, tablets, lozenges, melts, powders, suspensions, solutions, elixirs or emulsions. Solid unit dosage forms can be capsules of the ordinary gelatin type containing, for example, surfactants, lubricants, and inert fillers such as lactose, sucrose, and cornstarch, or the dosage forms can be sustained release preparations. The pharmaceutical composition may contain a solid carrier, such as a gelatin or an adjuvant. The tablet, capsule, and powder may contain from about 0.05 to about 95% of the active substance compound by dry weight. When administered in liquid form, a liquid carrier such as water, petroleum, oils of animal or plant origin such as peanut oil, mineral oil, soybean oil, or sesame oil, or synthetic oils may be added. The liquid form of the pharmaceutical composition may further contain physiological saline solution, dextrose or other saccharide solution, or glycols such as ethylene glycol, propylene glycol, or polyethylene glycol. When administered in liquid form, the pharmaceutical composition particularly contains from about 0.005 to about 95% by weight of the active substance. For example, a dose of about 10 mg to about 1000 mg once or twice a day could be administered orally.

In another embodiment, the active agents of the present disclosure can be tableted with conventional tablet bases such as lactose, sucrose, and cornstarch in combination with binders, such as acacia, cornstarch, or gelatin, disintegrating agents such as potato starch or alginic acid, and a lubricant such as stearic acid or magnesium stearate. Liquid preparations are prepared by dissolving the active agents in an aqueous or non-aqueous pharmaceutically acceptable solvent which may also contain suspending agents, sweetening agents, flavoring agents, and preservative agents as are known in the art.

For therapeutic administration, the active agents may be dissolved in a physiologically acceptable pharmaceutical carrier and administered as either a solution or a suspension. Illustrative of suitable pharmaceutical carriers are water, saline, dextrose solutions, fructose solutions, ethanol, or oils of animal, vegetative, or synthetic origin. The pharmaceutical carrier may also contain preservatives and buffers as are known in the art.

When an effective amount of the active agents is administered by intravenous, cutaneous, or subcutaneous injection, the compound is particularly in the form of a pyrogen-free, parenterally acceptable aqueous solution or suspension. The preparation of such parenterally acceptable solutions, having due regard to pH, isotonicity, stability, and the like, is well within the skill in the art. A particular pharmaceutical composition for intravenous, cutaneous, or subcutaneous injection may contain, in addition to the active agent, an isotonic vehicle such as Sodium Chloride Injection, Ringer's Injection, Dextrose Injection, Dextrose and Sodium Chloride Injection, Lactated Ringer's Injection, or other vehicle as known in the art. The pharmaceutical compositions of the present disclosure may also contain stabilizers, preservatives, buffers, antioxidants, or other additives known to those of skill in the art.

As noted, particular amounts and modes of administration can be determined by one skilled in the art. One skilled in the art of preparing formulations can readily select the proper form and mode of administration, depending upon the particular characteristics of the active agents selected, the condition to be treated, the stage of the condition, and other relevant circumstances using formulation technology known in the art, described, for example, in Remington: The Science and Practice of Pharmacy, $22^{nd}$ ed., relevant portions incorporated herein by reference.

Dosage Forms. The compositions of the present invention may be contained in various types of ophthalmic compositions, in accordance with formulation techniques known to those skilled in the art. For example, the compounds may be included in solutions, suspensions and other dosage forms adapted for the composition is formulated for topical, ophthalmic, topical administration, into the conjunctival sac, intravitreal, subconjunctival, retrobulbar, intracameral, or sub-Tenon's administration.

Ophthalmic compositions for use with the present invention will include one or more compositions that include one or more active agents selected from Gonadotropes, pituitary hormones, Gonadotropin-releasing hormones, LH, FSH, DHEA-S, Estrone, Estriol, or sex hormones, with a Prolactin-Inducible Protein (PIP) or a Gonadotropin-releasing hormone (GNRH) in an amount sufficient to increase the LH/FSH ratio. For example, PIP can be provided in an amount of 0.1 ng/ml to 1 mg/ml and/or GNRH provided in an amount of 0.1 pg/ml to 1 mg/ml in a pharmaceutically acceptable vehicle. Aqueous solutions are generally preferred, based on ease of formulation and physiological compatibility. The compositions of the present invention may be readily incorporated into other types of compositions, such as suspensions, viscous or semi-viscous gels or other types of solid or semi-solid compositions. The ophthalmic compositions of the present invention may also include various other ingredients, such as buffers, preservatives, co-solvents and viscosity building agents. Typically, the compositions that will be employed for topical application will range from about 0.1% to about 2.5% (w/v) of the active agent.

Examples of buffer systems include but are not limited to, hydrochloric acid/sodium hydroxide, sodium phosphate, sodium acetate or sodium borate, may be added to prevent pH drift under storage conditions.

Ophthalmic products are typically packaged in multidose form (2-15 ml volumes). Preservatives may be required to prevent microbial contamination during use. Suitable preservatives include: benzalkonium chloride, chlorohexidine, thimerosal, chlorobutanol, methyl paraben, propyl paraben, phenylethyl alcohol, edetate disodium, sorbic acid, polyquatemium-1, or other agents known to those skilled in the art. Some of these preservatives, however, may be unsuitable for particular applications (e.g., benzalkonium chloride may be unsuitable for intraocular injection or interference of preservatives with phenanthroline compositions). Such preservatives are typically employed at a level of from is 0.001 to 2.5% weight/volume ("w/v").

Topically administered drugs used to increase the ratio of LH/FSH are designed to gain access to the retina. For directly targeting the back of the eye for chronic conditions, delivery methods include direct administration to the area(s) around the eye by injection or in a depot or insert. Topical administration of the active agents will generally range between about 0.001% to about 2.5% weight/volume ("w/v"), and in some cases between about 0.5% and about 1.5% (w/v). Solutions, suspensions, ointments, gels, jellies and other dosage forms adapted for topical administration are often used. Similar dose ranges and effective doses as that for topical administration will be employed for the gel preparations. Additionally, the compositions of the present invention may be delivered slowly, over time, to the afflicted tissue of the eye through the use of inserts or contact lenses. For examples, the active agents may be soaked into the lenses in a solution containing the agents that increase the LH/FSH ratio and then applying the contact lenses to the eye for normal wear.

As used herein, the term "pharmaceutically acceptable carrier" refers to any formulation which is acceptable, i.e., safe and provides the appropriate delivery for the desired route of administration, of an effective amount of at least one compositions of the present invention. For example, a carrier suitable for topical ophthalmic delivery may comprise: anionic, mucomimetic polymers; gelling polysaccharides; finely-divided drug carrier substrates; and combinations thereof. Carriers for topical administration of the compounds of this invention include, but are not limited to, mineral oil, liquid petrolatum, white petrolatum, propylene glycol, polyoxyethylene, polyoxypropylene compound, emulsifying wax and/or water.

As used herein, the phrase "a therapeutically effective amount" of an agent(s) that increase the LH/FSH ratio is an amount sufficient to increase the LH/FSH ratio readily formulated into pharmaceutical dosing entities (i.e., drops, pills, gels, tablets, particles, nanoparticles, etc.).

Additional pharmaceutical methods may be employed to control the duration of action of the active agents. Increased half-life and/or controlled release preparations may be achieved through the use of proteins or polymers to conjugate, complex with, and/or absorb the active agents as discussed previously herein. The controlled delivery and/or increased half-life may be achieved by selecting appropriate macromolecules (for example but not by way of limitation, polysaccharides, polyesters, polyamino acids, homopolymers, polyvinyl pyrrolidone, ethylenevinylacetate, methylcellulose, or carboxymethylcellulose, and acrylamides such as N-(2-hydroxypropyl) methacrylamide), and the appropriate concentration of macromolecules as well as the methods of incorporation, in order to control release.

Another possible method useful in controlling the duration of action of the active agents by controlled release preparations and half-life is incorporation of the active agents or their functional derivatives into particles of a polymeric material such as polyesters, polyamides, polyamino acids, hydrogels, poly(lactic acid), ethylene vinylacetate copolymers, copolymer micelles of, for example, polyethylene glycol (PEG) and poly(l-aspartamide).

It is also possible to entrap the active agents in microcapsules prepared, for example, by coacervation techniques or by interfacial polymerization (for example, hydroxymethylcellulose or gelatine-microcapsules and poly-(methylmethacylate) microcapsules, respectively), in colloidal drug delivery systems (for example, liposomes, albumin microspheres, microemulsions, nano-particles, and nanocapsules), or in macroemulsions. Such techniques are well known to persons having ordinary skill in the art.

When the active agents are to be used as an injectable material, they can be formulated into a conventional injectable carrier. Suitable carriers include biocompatible and pharmaceutically acceptable phosphate buffered saline solutions, which are particularly isotonic.

For reconstitution of a lyophilized product in accordance with the present disclosure, one may employ a sterile diluent, which may contain materials generally recognized for approximating physiological conditions and/or as required by governmental regulation. In this respect, the sterile diluent may contain a buffering agent to obtain a physiologically acceptable pH, such as sodium chloride, saline, phosphate-buffered saline, and/or other substances which are physiologically acceptable and/or safe for use. In general, the material for intravenous injection in humans should conform to regulations established by the Food and Drug Administration, which are available to those in the field. The pharmaceutical composition may also be in the form of an aqueous solution containing many of the same substances as described above for the reconstitution of a lyophilized product.

The active agents can also be administered as a pharmaceutically acceptable acid- or base-addition salt, formed by reaction with inorganic acids such as hydrochloric acid, hydrobromic acid, perchloric acid, nitric acid, thiocyanic acid, sulfuric acid, and phosphoric acid, and organic acids such as formic acid, acetic acid, propionic acid, glycolic acid, lactic acid, pyruvic acid, oxalic acid, malonic acid, succinic acid, maleic acid, and fumaric acid, or by reaction with an inorganic base such as sodium hydroxide, ammonium hydroxide, potassium hydroxide, and organic bases such as mono-, di-, trialkyl and aryl amines, and substituted ethanolamines.

In certain embodiments, the present disclosure includes an active agent composition including: at least one of the active agents coupled directly or indirectly to a carrier molecule.

While the present disclosure has been described in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure. Thus the examples described above, which include particular embodiments, will serve to illustrate the practice of the present disclosure, it being understood that the particulars shown are by way of example and for purposes of illustrative discussion of particular embodiments only and are presented in the cause of providing what is believed to be the most useful and readily understood description of procedures as well as of the principles and conceptual aspects of the presently disclosed methods and compositions. Changes may be made in the formulation of the various compositions described herein, the methods described herein or in the steps or the sequence of steps of the methods described herein without departing from the spirit and scope of the present disclosure.

Participants, ethical approval, consent, and inclusion/exclusion criteria. The study adhered to the tenets of the Declaration of Helsinki. The studies were approved by The Central Denmark Region Committees on Health Research Ethics (protocol number: 1-10-72-127-16), and by the Institutional Review Board (IRB)/Ethics committee at the University of Oklahoma Health Sciences Center—Dean McGee Eye Institute (IRB protocol #3450). All participants underwent a thorough ophthalmologic examination including Pentacam HR, refraction, and slit lamp examination to confirm KC diagnosis and exclude any other ophthalmic diseases or dystrophies. Healthy controls underwent a similar ophthalmologic examination to ensure that they did not have KC or other eye diseases or dystrophies. Patients with any present or previous cancer as well as serious systemic diseases were excluded. However, patients with well-treated hypertension, well-treated hypercholesterolemia and well-treated asthma, were included. All participants signed a written informed consent before participation. All laboratory analyses of human biological fluids were performed blindly, to minimize bias. Table 1 shows KC severity groups, which were defined according to maximum corneal curvature (Kmax; worst/most severe eye), as well as demographic characteristics of KC patients and healthy controls.

TABLE 1

Demographic characteristics of the KC group and the healthy control group

|  | Healthy Controls | Keratoconus |
|---|---|---|
| Gender | | |
| Male | 22 | 63 |
| Female | 25 | 23 |
| Age Groups | | |
| 1: 15-29 y/o | 11 | 20 |
| 2: 30-45 y/o | 21 | 38 |
| 3: >46 y/o | 15 | 28 |
| Severity | | |
| 1: <48 D | — | 4 |
| 2: ≥48-53 D | — | 20 |
| 3: ≥53-58 D | — | 19 |
| 4: ≥58 D | — | 43 |
| Treatment | | |
| KC (One eye) | — | 13 |
| KC (Both eyes) | — | 53 |
| KC (All) | — | 86 |
| CXL (One eye) | — | 11 |
| CXL (Both eyes) | — | 7 |
| CXL (All) | — | 18 |
| Transplant | — | 9 |

Plasma sample collection. EDTA-coated 10 mL tubes (BD Vacutainer®, United States) were used for blood samples from all participants. EDTA-coated tubes were gently inverted to secure mixture of whole blood and centrifuged for 10 min at 1300 g at 4° C. to separate plasma. Plasma samples were then stored at −80° C., following transfer to sterile microfuge tubes, until further analyses.

Plasma ELISA. Hormone levels, in plasma samples, were detected using the following commercial immunoassay kits: Human Luteinizing Hormone ELISA Kit (Abcam, Cambridge, MA) and Human Follicle Stimulating Hormone ELISA Kit (Abcam, Cambridge, MA). Briefly, 50 μL of prepared standards and samples were loaded in duplicate into the appropriate wells, followed by an addition of 100 μL of enzyme conjugate reagent into each well. ELISA plates were incubated, in the dark, on a shaker at room temperature at 200 RPM for 45 minutes. Following rinsing with deionized water, 100 μL of TMB reagent was added into each well and gently mixed for 10 seconds. The plate was then incubated in the dark on a shaker at room temperature at 200 RPM for 20 minutes. 100 μL of stop solution was added to each well and gently mixed for 30 seconds. Within 15 minutes of mixing, the samples were measured in a plate reader at 450 nm. A curve-fitting statistical software was used to plot a 4-parameter logistic curve fit to the standards and then calculate results for all of the samples.

Corneal tissue processing and cell isolation. Healthy corneas were obtained from the National Disease Research Interchange (NDRI). KC corneas were obtained from individuals immediately following corneal transplantation. Inclusion/exclusion criteria for healthy controls required absence of ophthalmic disease, diabetes, or infectious conditions. Tissue from KC patients who had previously undergone collagen crosslinking was excluded.

Stromal Cells: Corneal stromal cells were isolated from Healthy (HCFs) and KC (HKCs) corneas. Briefly, using a surgical scalpel, the corneal epithelium and endothelium were removed. The corneal stroma was then washed in sterile PBS, and cut into small pieces (approximately 2×2×2 mm) and placed into flasks and allowed cells to adhere. Explants were grown 2-4 weeks at 37° C./5% $CO_2$/95% relative humidity, using Eagle's Minimum Essential Media (EMEM) supplemented with 10% fetal bovine serum (Atlanta Biologicals, Flowery Branch, GA), and antibiotic/antimycotic (Anti/Anti, Life Technologies, Grand Island, NY). Once confluent, cells were isolated following trypsinization, subcultured, or frozen using standard cryoprotective protocols.

Epithelial Cells: Telomerase-immortalized human corneal epithelial cells were kindly provided by Dr. Pablo Argueso (Schepens Eye Research Institute/Mass. Eye and Ear, and stored in liquid nitrogen until further analysis.

Cell Cultures and In Vitro Models.

3D constructs—Stromal Cells: HCFs and HKCs were plated at a density of 1×10⁶ cells/well on six-well size polycarbonate membrane inserts with 0.4-μm pores (VWR, Radnor, PA). The cells were cultured in EMEM containing 10% FBS, 1% antibiotic, and stimulated with a stable Vitamin C derivative (0.5 mM 2-O-α-D-glucopyranosyl-L-ascorbic acid: Sigma-Aldrich, St. Louis, MO). Cultures were grown for a total of 4 weeks and fresh media was supplied every other day for the duration of the study. Protein extraction and further analysis occurred at the 4 week timepoint.

2D conventional cultures—Epithelial Cells: Cells were brought up from liquid nitrogen and cultured in a T75 flask in epithelial media, consisting of Keratinocyte Growth Media 2 PromoCell (VWR, Radnor, PA), Penicillin-Streptomycin Solution (ThermoFisher, Rockford, IL), and $CaCl_2$ (Sigma-Aldrich, St. Louis, MO). Once confluent, cells were removed via trypsinization and seeded in a 6-well plate at 1×10⁶ cells/well in epithelial media. Cells were cultured at 37° C. for 24 hours before protein was extracted.

Protein Extraction and Western Blot analysis. All cultures were collected, washed 2× with PBS, and total protein was isolated using 1× radioimmunoprecipitation assay (RIPA) buffer (50 mM Tris pH 8, 150 mM NaCl, 1% Triton X-100, and 0.1% SDS) containing protease inhibitor cocktail (Sigma-Aldrich, St. Louis, MO). Cell lysates were centrifuged at 4° C., the supernatant isolated, and subjected to a Pierce BCA Protein assay (ThermoScientific, Rockford, IL) for protein concentration quantification. Novex 4-20% Tris-glycine mini WedgeWell format 12-well gels (FisherScientific, Hampton, NH) electrophoresed at 135-140 V for 1.5 hours, and transferred onto a nitrocellulose membrane at 100 V for 1 hour on ice. Blots were blocked in 5% dry milk (Great Value, Bentonville, AR) for 1 hour, at room temperature, with shaking. After preparing primary antibodies in a 1:1000 dilution, blots were incubated in mouse monoclonal antibody FSH (FisherScientific, Hampton, NH) and the following primary rabbit polyclonal antibodies: β-Actin (Abcam, Cambridge, MA), FSH-R (Abcam, Cambridge, MA), LH-R (Abcam, Cambridge, MA), and LH (Bioss, Woburn, MA) while rocking overnight in 4° C. and washed with TBST before being incubated in the diluted secondary antibody goat anti-mouse IgG (H+L) AlexaFluor Plus 555 (ThermoFisher Scientific, Rockford, IL) while rocking for 1 hour in room temperature. After washing with TBST, the blot was allow to dry and imaged using a ChemiDoc-It² imager. Results were analyzed by normalizing values to the expression of housekeeping antibody β-Actin (Abcam, Cambridge, MA).

Statistical analysis. Data analysis and presentation was executed using GraphPad Prism 7.0 (GraphPad Software, Inc., La Jolla, CA, USA). Data are presented as mean+/− SEM using bar plots. Dot-box plots are, also, provided as supplemental figures. Using one-way ANOVA, and t-test where necessary, a value of $p<0.05$ was considered significant. The n number for each experiment is listed in the appropriate legend and/or the bar plot.

Figure 1A:
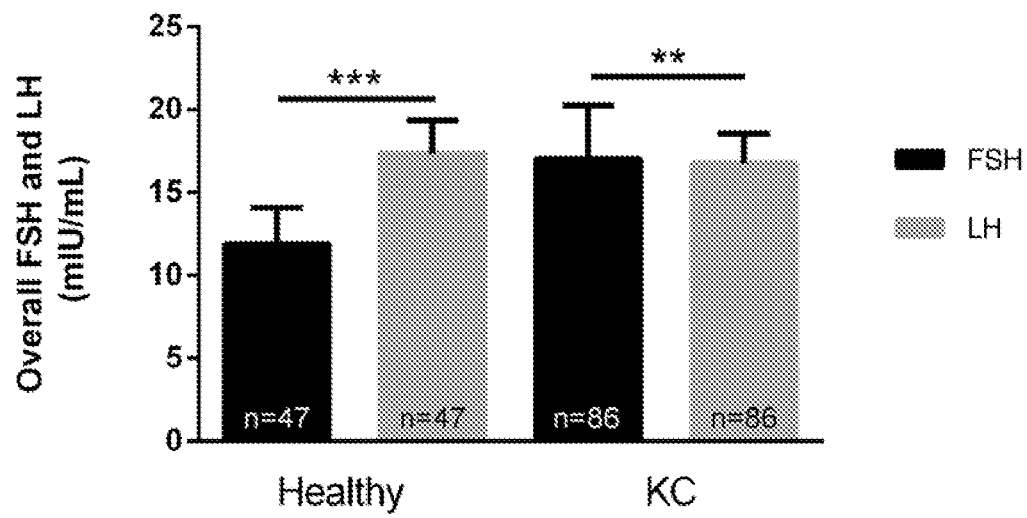
FIGS. 1A and 1B show expression of LH, FSH, and LH/FSH ratio in Healthy (n=47) and KC (n=86) blood (plasma) samples.

LH/FSH in Healthy and KCs. The expression of LH and FSH in human plasma samples from KC patients and Healthy controls was determined using ELISAs. Human plasma is easily accessible and is commonly used in both clinical and biological studies. FSH levels were elevated in KCs, but not significantly, when compared to Healthy controls (FIG. 1A). Similarly, LH levels, showed no significant differences between Healthy and KCs (FIG. 1A). In Healthy controls, LH levels were higher than those of FSH (FIG. 1A) while in KCs the opposite was observed (FIG. 1A).

Figure 1B:
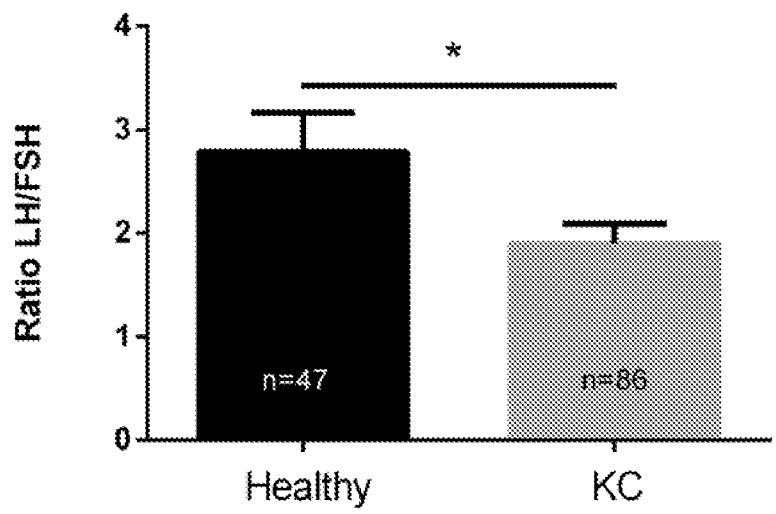

The circulating levels of LH/FSH ratio is deemed a more relevant measure and has been investigated as a potential marker in polycystic ovary syndrome. Surprisingly, the present findings showed a significantly lower LH/FSH ratio in KCs, when compared to Healthy controls (FIG. 1B). This is the first evidence ever reported that indicates a correlation between KC pathology and the circulating LH/FSH.

Figure 2A:
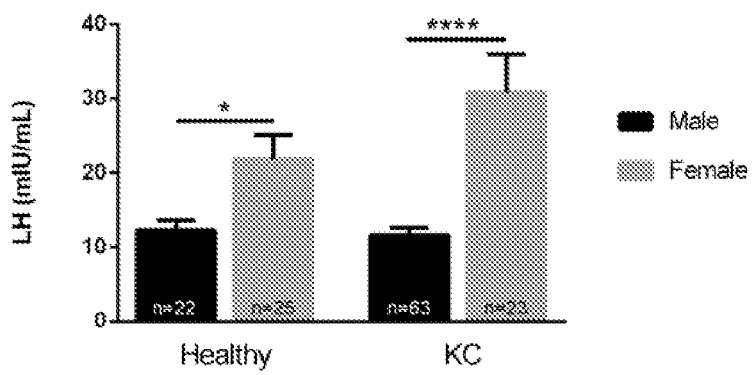
FIGS. 2A to 2C show gender-dependent expression of LH, FSH, and LH/FSH ratio in Healthy and KC blood (plasma) samples.
Figure 2B:
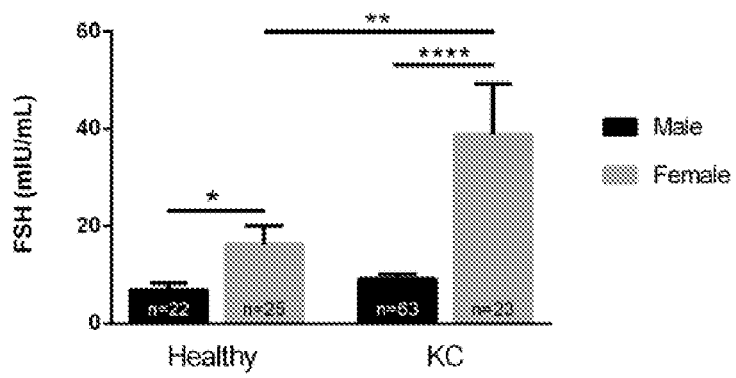

Gender Dependence. Depending on the geographical region and the cohort of patients, gender bias in KC is at best inconsistent. The inventors investigated the levels of LH and FSH in the context of male and female patients. The data shows that both LH (FIG. 2A) and FSH (FIG. 2B) levels were higher in females, as compared to males. This was true for both Healthy Controls and KCs, although this disparity was much more prominent in KCs. Furthermore, FSH in female KCs was significantly higher than the FSH levels in Healthy females (FIG. 2B).

Figure 2C:
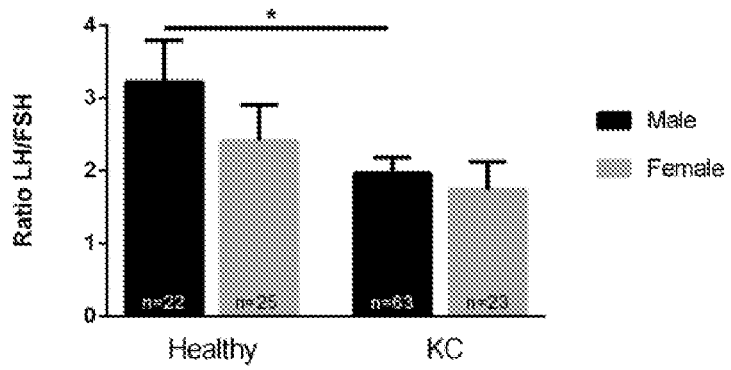

Regarding LH/FSH ratio, KCs showed a lower ratio in both males and females (FIG. 2C), when compared to their Healthy counterparts. Specifically, LH/FSH ratio in KC-Females tended to be lower than in Healthy-Females, but not significantly (FIG. 2C). However, the LH/FSH ratio in KC-Males was significantly lower compared to Healthy-Males (FIG. 2C).

LH and FSH bind to receptors in the testis and ovary regulating gonadal function by promoting sex steroid production and gametogenesis. There is a known gender-biased for the two hormones which manifests further downstream of the sex hormones. This would suggest that any changes seen here are more related to KC gender pathology rather an LH and FSH gender bias. Therefore, the LH/FSH ratio could be a measure used to "bypass" all the inconsistencies and discrepancies seen between genders, in KC, at different geographical regions.

Figure 3A:
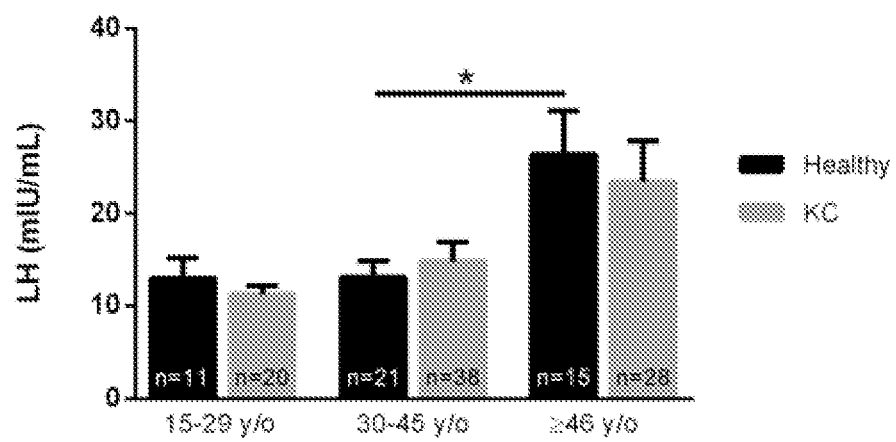
FIGS. 3A to 3C show age-dependent expression of LH, FSH, and LH/FSH ratio in Healthy and KC blood (plasma) samples. Three age groups were investigated: Healthy 15-29 y/o (n=11), KC 15-29 y/o (n=20), Healthy 30-45 y/o (n=21), KC 30-45 y/o (n=38), Healthy≥46 y/o (n=15) and KC≥46 y/o (n=28).
Figure 3B:
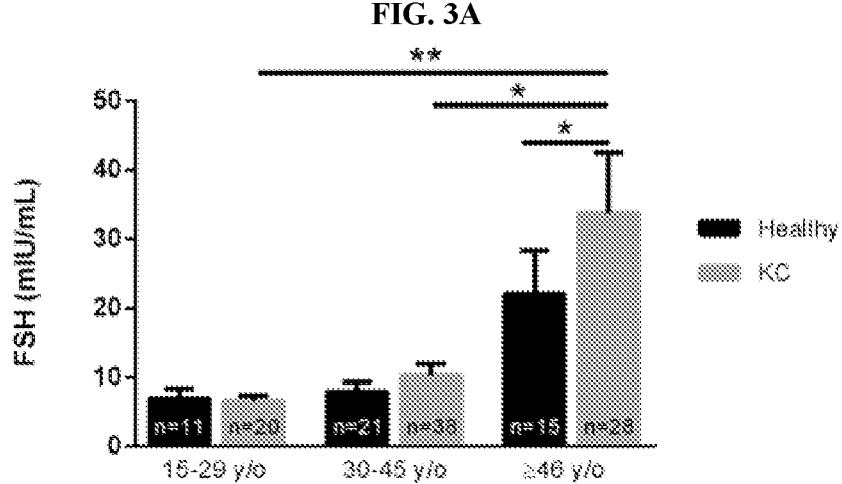
Figure 3C:
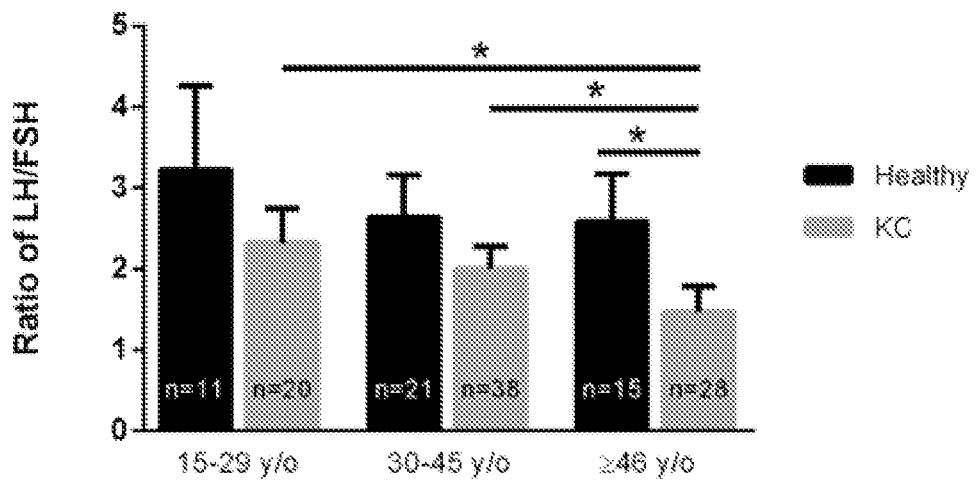

Age Dependence. KC is known to appear around puberty and arrest itself by the age of 40 of 50. The inventors investigated the plasma levels of both LH and FSH in three age groups: 15-29 y/o, 30-45 y/o, and 46-older. Both LH and FSH remained unchanged, in KCs and Healthy controls, for age groups 15-29 y/o and 30-45 y/o (FIG. 3A). However, at age group 46 or older, significant upregulation of LH (FIG. 3A) or FSH (FIG. 3B) was seen in Healthy and KCs, respectively. The LH/FSH ratio, showed significant progressive downregulation in KCs, from the younger to the older population, whereas the ratio remained unchanged in Healthy (FIG. 3C).

Figure 4A:
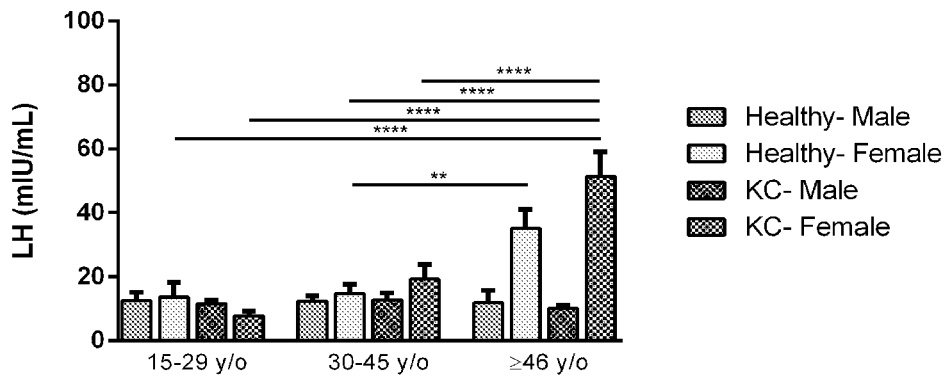
FIGS. 4A-4C show age effect as a function of gender expression of LH, FSH, and LH/FSH ratio in Healthy and KC blood (plasma) samples. The following groups were investigated: Healthy Males 15-29 y/o (n=7), Healthy Females 15-29 y/o (n=4), KC Males 15-29 y/o (n=18), KC Females 15-29 y/o (n=2), Healthy Males 30-45 y/o (n=10), Healthy Females 30-45 y/o (n=12), KC Males 30-45 y/o (n=26), KC Females 30-45 y/o (n=12), Healthy Males ≥46 y/o (n=5), Healthy Females ≥46 y/o (n=9), KC males ≥46 y/o (n=19), KC Females ≥46 y/o (n=9). 4A) LH levels in Heathy and KCs, 4B) FSH levels in Healthy and KCs and C) LH/FSH ratio in Healthy and KCs, per age group. ****$p<0.0001$.
Figure 4B:
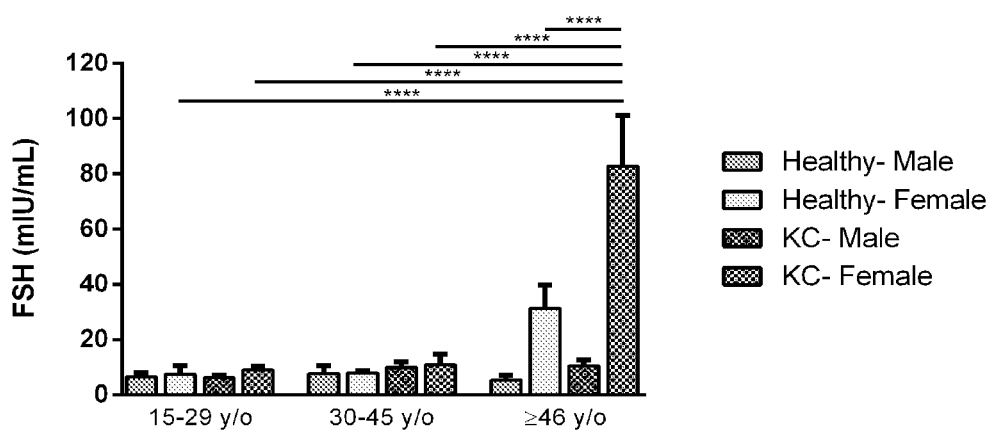

The inventors further investigated the effects of age as it relates to gender, in KCs and Healthy. Both male/female LH and FSH were unchanged for age groups 15-29 y/o and 30-45 y/o (FIGS. 4A and 4B, respectively), in both KCs and Healthy. However, age group 46-older showed increased levels of LH and FSH in KC-Females and Healthy-Females. This suggests that the increase for total LH and FSH (FIG. 1) is largely due to the female population.

Figure 4C:
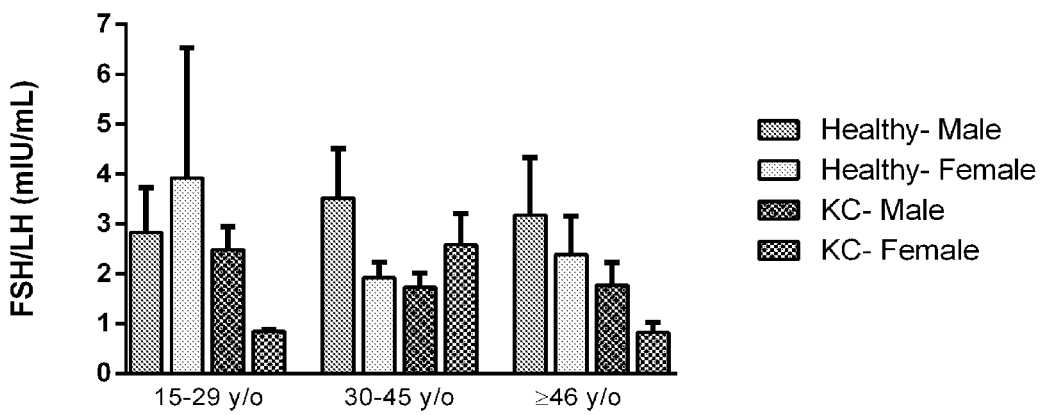

The LH/FSH ratio analysis, showed no significant changes. However, it is interesting to highlight that the lowest LH/FSH ratio was seen in KC-Females at the 15-29 y/o and ≥46 y/o age groups (FIG. 4C).

KC Severity. LH and FSH levels were investigated based on KC severity. Severity groups were defined according to maximum corneal curvature (Kmax). LH (FIG. 5A) and FSH (FIG. 5B) levels were largely unaffected among the severity grades (KC1 through KC4), as well as when compared to Healthy. The LH/FSH ratio was significantly downregulated with the KC4 group (FIG. 5C), but remained unchanged for the rest of the severity groups.

KC Treatment by Corneal Transplant or Collagen Crosslinking. Treatment by corneal transplant or by collagen crosslinking may provide some relief of KC symptoms for some patients. In order to determine if KC presence and/or type of treatment(s) affected the levels of either LH or FSH, the following groups were investigated: Individuals with: 1) KC on one eye, 2) KC on both eyes, 3) KCs with corneal transplants, 4) All KCs independent of treatment(s), 5) KCs with collagen crosslinking on one eye, 6) KCs with collagen crosslinking on both eyes, and 7) All KCs with collagen crosslinking treatment, independent of the number of eyes. All seven groups were plotted and compared against the Healthy controls (FIG. 6). There was no significant differences in the LH (FIG. 6A) or FSH (FIG. 6B) levels between the groups/treatments tested and their Healthy counterparts. Similarly, there were no significant differences among groups/treatments or compared to Healthy, in the LH/FSH ratio. LH/FSH ratio in KC (All) (FIG. 6C) was significantly downregulated, when compared to Healthy, as shown in FIG. 1B.

Gonadotropins and Extragonadal Tissue. Based on the in vivo data, whether the corneal stroma cells express LH/FSH and their corresponding receptors (LHR/FSHR) was examined. Traditionally, expression of these gonadotropins has been thought to be restricted to gonadal tissue. However, recent studies have shown at least LH expressed in some peripheral tissues. FSH seems to be more exclusive to the gonadal tissues. Surprisingly, both HCFs and HKCs expressed LH, but not FSH, with no significant differences between the two cell types. Furthermore, expression of both LH-R and FSH-R, with LHR upregulated and FSHR downregulated was found in HKCs when compared to HCFs. Not surprisingly, the findings were different in HCECs. HCECs only expressed FSHR, while no expression was detected for LH, FSH, or LHR.

The expression of LH, FSH, and their receptors (LHR and FSHR) was investigated, utilizing the inventors' established 3D in vitro model. FIG. 7A shows expression of LH in both HCFs and HKCs, with no significant differences. FSH was not expressed in either HCFs or HKCs. Expression of LHR was significantly upregulated in HKCs (FIG. 7B), whereas FSHR (FIG. 7C) was significantly downregulated, when compared to HCFs.

The appears to be the first study to demonstrate the presence of LH/LHR/FSHR in the human corneal stroma. These findings indicate that gonadotropins play a key role in the onset and/or progression of KC. At the very least, corneal stromal cells have the appropriate receptors to respond to gonadotropin-initiated signals. In order to further determine whether the gonadotropin presence is only in the corneal stroma or extends to other cellular layers within the cornea, established epithelial cells were tested in vitro. FIG. 8 shows that HCECs only expressed FSH-R. The inventors found no expression for LH, FSH, or LH-R.

The human eye has generally been considered as "neutral" in terms of gender bias. There has never been enough evidence to suggest that ocular physiology or pathology is affected by sex. Sex plays a key role in ocular health and disease, driven by the presence (or absence) of sex hormones. Sex hormones circulate through the blood stream, and profoundly affect the physiology of multiple organs and tissue. Their effects are highly dependent on the receptors present in the various target tissues/cells. In the human cornea, sex hormones are present in the tear fluid, secreted by the migratory plasma cells and the secretory epithelium of the lacrimal gland. Inevitably, with the tears in direct contact with the ocular surface, hormonal fluctuations may alter corneal homeostasis and therefore visual acuity. Aqueous humor, located posteriorly to the cornea, can also influence corneal homeostasis.

The inventors recently reported significant elevation of DHEA-S and decreased estrone and estriol levels, in KC tears, saliva, and blood (plasma). Surprisingly, the data showed that modulation of these sex hormones were independent of age, gender and KC severity, suggesting that something more fundamental is altered during disease state. In light of the accumulated data on sex hormones and KC, the inventors sought to delineate and unravel the KC etiology.

KC is a very peculiar disease, in that gender and age prevalence seem to be highly variable depending on the cohort(s) examined. It was therefore suspected that androgens/estrogens are malfunctioning, in KCs, due to a dysfunction further upstream in the hormone cascade. The present data show significant modulation of LH and/or FSH hormones in KCs, when compared to Healthy controls. These findings indicate that FSH and/or LH dysfunction causes abnormal modulation of DHEA-S, Estriol, and Estrone that is seen downstream.

Based on these surprising findings, non-invasive KC treatment alternatives to corneal transplants and collagen crosslinking were explored.

FIGS. 9A to 9C shows that the LH/FSH ratio is modulated in vitro by DHEA, Estrone, and Estriol stimulation. Note that when treated by DHEA, Estrone or Estriol, HKCs are "recovering" towards a healthy phenotype, whereas HCFs are moving towards a disease-phenotype. HKCs are cells from Keratoconus patients. HCFs are cells from Healthy individuals.

In FIGS. 9A to 9C, healthy corneas were obtained from the National Disease Research Interchange (NDRI). KC corneas were obtained from individuals immediately following corneal transplantation. Inclusion/exclusion criteria for healthy controls required absence of ophthalmic disease, diabetes, or infectious conditions. Tissue from KC patients who had previously undergone collagen crosslinking was excluded. Corneal stromal cells were isolated from healthy (HCFs) and KC (HKCs) corneas. Both HCFs and HKCs were isolated as previously described [25,26]. Briefly, using a surgical scalpel, the corneal epithelium and endothelium were removed. The corneal stroma was then washed in sterile PBS, cut into small pieces (approximately 2×2 mm), and placed into flasks; the cells were then allowed to adhere. Explants were grown for 2-4 weeks at 37° C./5% $CO_2$/95% relative humidity, using Eagle's Minimum Essential Media (EMEM) supplemented with 10% fetal bovine serum (Atlanta Biologicals, Flowery Branch, GA, USA), and antibiotic/antimycotic (Anti/Anti, Life Technologies, Grand Island, NY, USA). Once confluent, cells were isolated following trypsinization, subcultured, or frozen using standard cryoprotective protocols. Three-dimensional constructs: —HCFs and HKCs were plated at a density of $1\times10^6$ cells/well on six-well size polycarbonate membrane inserts with 0.4-μm pores (VWR, Radnor, PA, USA). The cells were cultured in EMEM containing 10% FBS, 1% antibiotic, and stimulated with a stable Vitamin C derivative (0.5 mM 2-O-α-D-glucopyranosyl-L-ascorbic acid: Sigma-Aldrich, St. Louis, MO, USA). Cultures were grown for a total of 4 weeks and fresh media was supplied every other day for the duration of the study. Protein extraction and further analysis occurred at the 4-week timepoint.

All cultures were collected and washed twice with PBS, and total protein was isolated using 1× radioimmunoprecipitation assay (RIPA) buffer (50 mM Tris pH 8, 150 mM NaCl, 1% Triton X-100, and 0.1% SDS) containing a protease inhibitor cocktail (Sigma-Aldrich, St. Louis, MO, USA). Cell lysates were centrifuged at 4° C., and the supernatant was isolated and subjected to a Pierce BCA Protein assay (ThermoScientific, Rockford, IL, USA) for protein concentration quantification. Novex 4-20% Trisglycine mini WedgeWell format 12-well gels (FisherScientific, Hampton, NH, USA) were electrophoresed at 130 V for 1.5 h, and transferred onto a nitrocellulose membrane at 100 V for 1 hour on ice. B lots were blocked in 5% dry milk (Great Value, Bentonville, AR, USA) for 1 h, at room temperature, with shaking. After preparing primary antibodies in a 1:1000 dilution, blots were incubated in mouse monoclonal antibody FSH (FisherScientific, Hampton, NH, USA) and the following primary rabbit polyclonal antibodies: β-Actin (Abcam, Cambridge, MA, USA), and LH (Bioss, Woburn, MA, USA). The samples were rocked overnight at 4° C., and washed with TBST before being incubated in the diluted secondary antibody goat anti-mouse IgG (H+L) AlexaFluor Plus 555 (ThermoFisher Scientific, Rockford, IL, USA) while rocking for 1 hour at room temperature. After washing with TBST, the blot was allowed to dry and imaged using a ChemiDoc-It$^2$ imager. Results were analyzed by normalizing values to the expression of housekeeping antibody β-Actin (Abcam, Cambridge, MA, USA).

FIGS. 10A and 10B shows that the GnRH-Receptor is modulated by both FSH and LH stimulation, in a dose dependent manner. In FIGS. 10A and 10B HCFs and HKCs were seeded in 12-well plates at $5\times10^5$ cells/well in regular media. 24 hours later media was replaced for treatment media (regular media supplemented with the treatment). The treatments consisted of: FSH: 2.5 and 10 miu/ml; LH: 5 and 35 miu/ml. After 48 hours treatment finished and all the wells were wash with PBS and proteins were extracted using 1 ml of RIPA buffer 1×. Bradford assay (Thermo scientific, IL, USA) was carried out to determine the protein concentration and normalize the samples. For western blot analysis samples were mixed with loading buffer and equal amounts of protein were loaded (25 μg per lane) on a 4-20% TrisGlycine gel (Novex, Life technologies, Carlsbad, CA) and electrophoresed at 135-140V for 1.5 hour. Each sample was run single. Thereafter, the gel was transferred on to a nitrocellulose membrane (Novex, Nitrocellulose membrane, Life Technologies, Carlsbad, CA), at 100V for 1 hour on ice. Finally, the membranes were blocked in milk (5% milk in TBST; Thermo scientific, IL, USA) for 1 hour and incubated overnight in the rocker at 4° C. with the primary antibody at 1:250 dilution. The primary antibodies used for this experiment were rabbit polyclonal to LHR (ab125214, Abcam, Cambridge, MA), and Rabbit polyclonal GNRHR (ab183079, Abcam, Cambridge, MA). GAPDH (rabbit polyclonal ab9485, Abcam, Cambridge, MA) was used as housekeeping for all the targets at a dilution of 1:1000. All primary antibodies and the housekeeping were washed three times with TBST and then incubated for 1 hour at room temperature in the rocker with the secondary antibody at a dilution of 1:2000, AlexaFlour 568 (ThermoFisher Scientific, Rockford, IL, USA). After washing three times with TBST, the membranes let dried and imaged using an iBright 1500 imager (ThermoFisher Scientific, Rockford, IL, USA).

FIGS. 11A and 11B show GnRH expression in a small age-matched cohort that included 20 KC and 20 Healthy individuals. In blood (plasma; FIG. 11A) the GnRH expression was significantly lower in KCs, when compared to their healthy counterparts. The inventors have shown the importance of saliva in KCs side-by-side with blood (plasma). GnRH expression in KC saliva, from the same cohort, was downregulated compared to healthy individuals but did not reach significance Gonadotropin-releasing hormone levels were detected in plasma and saliva samples using commercially available enzyme-linked immunosorbent assay kits: Human Gonadotropin-releasing Hormone ELISA Kit-Cat. #MBS161281 (MyBioSource, San Diego, CA, USA) and Human GnRH ELISA Kit-Cat. #MBS2515500 (MyBioSource, San Diego, CA, USA). The saliva ELISA kit (Cat. #MBS2515500) added 50 μL of prepared standards in duplicated into the appropriate wells. Next, 50 μL of each saliva sample was added to the other wells. Immediately after, 50 μL of a biotinylated detecting antibody solution was added into all wells; then, the ELISA plate was covered with a sealer and inoculated for 45 minutes at 37° C. The solution was then discarded from each well and pat dry against clean absorbent paper towels. Approximately 350 μL of washer buffer were then added using a Stat-Matic plate washer (ThermoFisher Scientific, Waltham, MA, USA) to each well and soaked for 1 minute, following decant and pat dry. This rinsing process was repeated two more times. The ELISA plate was then incubated with 100 μL of horseradish peroxidase (HRP) conjugated working solution in each well, covered with a new plate sealer, and incubated for 30 minutes at 37° C. Following incubation, the solution was discarded, and the rinsing process described above was conducted five times. Following the rinsing step, 904 of substrate reagent was added to each well; the plate was then covered in foil to protect from light and incubated for 15 minutes at 37° C. Finally, 504 of a stop solution was added to each well, gently mixed, and the plates optical density was read immediately with BioTek EPOCH2 microplate reader (BioTek, Winooski, VT, USA) set at 450 nm. BioTek software was programmed to calculate each sample's results by plotting the optical density values using a 4-parameter logistic curve fit to the standards. The plasma ELISA kit (Cat.

MBS161281) added 50₄ of prepared standards in duplicated into the appropriate wells. Then 40₄ of plasma sample was added to the other wells, and 10₄ of anti-GnRH antibody was added to each sample well. (Note: do not add any anti-GnRH antibodies to the standard wells.) Next, 50₄ of Streptavidin-HRP was added to both the sample and standard wells, mixed, covered with a plate sealer, and incubated for 60 minutes at 37° C. Following incubation, the ELISA plate was rinsed five times using the same rinsing process described above. Following the rinsing step, 50 µL of substrate solution A and B were added to each well; the plate was then covered in foil to protect from light and incubated for 10 minutes at 37° C. Lastly, 50 µL of a stop solution was added to each well, gently mixed, and read immediately at 450 nm using BioTek EPOCH2 microplate reader (BioTek, Winooski, VT, USA). BioTek software was programmed to calculated results as described above.

FIG. 12 shows that the LH/FSH ratio is modulated by PIP, in a concentration dependent manner in both Healthy and KC cells. In FIG. 12, HCFs and HKCs were seeded in 12-well plates at $5\times10^5$ cells/well in regular media. 24 hours later media was replaced for treatment media (regular media supplemented with the treatment). The treatments consisted on five different concentrations of PIP: 50 ng/ml, 100 ng/ml, 200 ng/ml, 350 ng/ml and 500 ng/ml at a number of four wells per treatment. After 48 hours treatment finished and all the wells were wash with PBS and proteins were extracted using 1 ml of RIPA buffer 1×. Bradford assay (Thermo scientific, IL, USA) was carried out to determine the protein concentration and normalize the samples. For western blot analysis samples were mixed with loading buffer and equal amounts of protein were loaded (25 µg per lane) on a 4-20% Tris-Glycine gel (Novex, Life technologies, Carlsbad, CA) and electrophoresed at 135-140V for 1.5 hour. Each sample was run single. T hereafter, the gel was transferred on to a nitrocellulose membrane (Novex, Nitrocellulose membrane, Life Technologies, Carlsbad, CA), at 100V for 1 hour on ice. Finally, the membranes were blocked in milk (5% milk in TBST; Thermo scientific, IL, USA) for 1 hour and incubated overnight in the rocker at 4° C. with the primary antibody at 1:250 dilution. The primary antibodies used for this experiment were rabbit polyclonal to LH (BS0952R, Bioss, Woburn, MA) and rabbit monoclonal to FSH (MIF2710, Invitrogen, Carlsbad, CA). GAPDH (rabbit polyclonal ab9485, Abcam, Cambridge, MA) was used as housekeeping for all the targets at a dilution of 1:1000. All primary antibodies and the housekeeping were washed three times with TBST and then incubated for 1 hour at room temperature in the rocker with the secondary antibody at a dilution of 1:2000, AlexaFlour 568 (ThermoFisher Scientific, Rockford, IL, USA). After washing three times with TBST, the membranes let dried and imaged using an iBright 1500 imager (ThermoFisher Scientific, Rockford, IL, USA).

By way of explanation, and in no way a limitation of the present invention, the presently proposed mode of action for KC development is via the regulation of gonadotropins, at the pituitary gland, and their receptors within the human corneal microenvironment, leading to changes of ECM proteins, which are critical in maintaining the corneal homeostasis. It is plausible that LH/FSH dysfunctions appear at birth, or at very early stages in life, and KC is a manifestation of prolonged hormonal abnormalities derived from the anterior pituitary.

In at least one embodiment, the present disclosure is directed to a method for treating an LH/FSH-related disease or condition in a subject by administering Prolactin-Induced Protein to the subject to increase a circulating LH/FSH ratio in the subject.

In at least one embodiment, the present invention does not include Polycystic Ovarian Syndrome, hyperprolactinemia, gonadotropin deficiency, luteal phase defects, low fecundability, idiopathic precocious puberty and precocious puberty due to hypothalamic hamartoma, ovarian cancer, epilepsy, amenorrhea, or congenital uterus and vaginal aplasia (Mayer-Rokitanski-Kuster-Hauser (MRKH) syndrome).

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention (s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

To aid the Patent Office, and any readers of any patent issued on this application in interpreting the claims appended hereto, applicants wish to note that they do not intend any of the appended claims to invoke paragraph 6 of 35 U.S.C. § 112, U.S.C. § 112 paragraph (f), or equivalent, as it exists on the date of filing hereof unless the words "means for" or "step for" are explicitly used in the particular claim.

For each of the claims, each dependent claim can depend both from the independent claim and from each of the prior dependent claims for each and every claim so long as the prior claim provides a proper antecedent basis for a claim term or element.

REFERENCES

1. Gordon-Shaag, A.; Millodot, M.; Shneor, E.; Liu, Y. The genetic and environmental factors for keratoconus. BioMed Res. Int. 2015, 2015, 795738.
2. Thanos, S.; Oellers, P.; Meyer Zu Horste, M.; Prokosch, V.; Schlatt, S.; Seitz, B.; Gatzioufas, Z. Role of Thyroxine in the Development of Keratoconus. Cornea 2016, 35, 1338-1346.
3. Rabinowitz, Y. S. Keratoconus. Surv. Ophthalmol. 1998, 42, 297-319.
4. Kennedy, R. H.; Bourne, W. M.; Dyer, J. A. A 48-year clinical and epidemiologic study of keratoconus. Am. J. Ophthalmol. 1986, 101, 267-273.
5. Varssano, D.; Kaiserman, I.; Hazarbassanov, R. Topographic patterns in refractive surgery candidates. Cornea 2004, 23, 602-607.
6. Bamashmus, M. A.; Saleh, M. F.; Awadalla, M. A. Reasons for not performing keratorefractive surgery in patients seeking refractive surgery in a hospital-based cohort in "yemen". Middle East Afr. J. Ophthalmol. 2010, 17, 349-353.
7. Zadnik, K.; Mannis, M. J.; Johnson, C. A. An analysis of contrast sensitivity in identical twins with keratoconus. Cornea 1984, 3, 99-103.
8. Gokhale, N. S. Epidemiology of keratoconus. Indian J. Ophthalmol. 2013, 61, 382-383.
9. Krachmer, J. H. Eye rubbing can cause keratoconus. Cornea 2004, 23, 539-540.
10. McKay, T. B.; Hjortdal, J.; Sejersen, H.; Karamichos, D. Differential Effects of Hormones on Cellular Metabolism in Keratoconus In Vitro. Sci. Rep. 2017, 7, 42896.
11. McKay, T. B.; Hjortdal, J.; Sejersen, H.; Asara, J. M.; Wu, J.; Karamichos, D. Endocrine and Metabolic Pathways Linked to Keratoconus: Implications for the Role of Hormones in the Stromal Microenvironment. Sci. Rep. 2016, 6, 25534.
12. Sharif, R.; Bak-Nielsen, S.; Sejersen, H.; Ding, K.; Hjortdal, J.; Karamichos, D. Prolactin-Induced Protein is a novel biomarker for Keratoconus. Exp. Eye Res. 2019, 179, 55-63.
13. Suzuki, T.; Kinoshita, Y.; Tachibana, M.; Matsushima, Y.; Kobayashi, Y.; Adachi, W.; Sotozono, C.; Kinoshita, S. Expression of sex steroid hormone receptors in human cornea. Curr. Eye Res. 2001, 22, 28-33.
14. Atas, M.; Demircan, S.; Karatepe Hashas, A. S.; Gulhan, A.; Zararsiz, G. Comparison of corneal endothelial changes following phacoemulsification with transversal and torsional phacoemulsification machines. Int. J. Ophthalmol. 2014, 7, 822-827.
15. Bilgihan, K.; Hondur, A.; Sul, S.; Ozturk, S. Pregnancy-induced progression of keratoconus. Cornea 2011, 30, 991-994.
16. George, J. W.; Dille, E. A.; Heckert, L. L. Current concepts of follicle-stimulating hormone receptor gene regulation. Biol. Reprod. 2011, 84, 7-17.

17. Stamatiades, G. A.; Kaiser, U. B. Gonadotropin regulation by pulsatile GnRH: Signaling and gene expression. Mol. Cell. Endocrinol. 2018, 463, 131-141.
18. Ulloa-Aguirre, A.; Reiter, E.; Crepieux, P. FSH Receptor Signaling: Complexity of Interactions and Signal Diversity. Endocrinology 2018, 159, 3020-3035.
19. Choi, J.; Smitz, J. Luteinizing hormone and human chorionic gonadotropin: Distinguishing unique physiologic roles. Gynecol. Endocrinol. 2014, 30, 174-181.
20. Venencie, P. Y.; Meduri, G.; Pissard, S.; Jolivet, A.; Loosfelt, H.; Milgrom, E.; Misrahi, M. Luteinizing hormone/human chorionic gonadotrophin receptors in various epidermal structures. Br. J. Dermatol. 1999, 141, 438-446.
21. Chen, A.; Kaganovsky, E.; Rahimipour, S.; Ben-Aroya, N.; Okon, E.; Koch, Y. Two forms of gonadotropin-releasing hormone (GnRH) are expressed in human breast tissue and overexpressed in breast cancer: A putative mechanism for the antiproliferative e_ect of GnRH by down-regulation of acidic ribosomal phosphoproteins P1 and P2. Cancer Res. 2002, 62, 1036-1044.
22. Shemesh, M. Actions of gonadotrophins on the uterus. Reproduction 2001, 121, 835-842.
23. Pabon, J. E.; Li, X.; Lei, Z. M.; Sanfilippo, J. S.; Yussman, M. A.; Rao, C. V. Novel presence of luteinizing hormone/chorionic gonadotropin receptors in human adrenal glands. J. Clin. Endocrinol. Metab. 1996, 81, 2397-2400.
24. Tuck, M.; Turgeon, D. K.; Brenner, D. E. Chapter 5-Serum and Plasma Collection: Preanalytical Variables and Standard Operating Procedures in Biomarker Research A2-Issaq, Haleem J. In Proteomic and Metabolomic Approaches to Biomarker Discovery; Veenstra, T. D., Ed.; Academic Press: Boston, MA, USA, 2013; pp. 77-85.
25. Karamichos, D.; Hutcheon, A. E.; Rich, C. B.; Trinkaus-Randall, V.; Asara, J. M.; Zieske, J. D. In vitro model suggests oxidative stress involved in keratoconus disease. Sci. Rep. 2014, 4, 4608.
26. Karamichos, D.; Zareian, R.; Guo, X.; Hutcheon, A. E.; Ruberti, J. W.; Zieske, J. D. Novel in Vitro Model for Keratoconus Disease. J. Funct. Biomater. 2012, 3, 760-775.
27. Gipson, I. K.; Spurr-Michaud, S.; Argueso, P.; Tisdale, A.; Ng, T. F.; Russo, C. L. Mucin gene expression in immortalized human corneal-limbal and conjunctival epithelial cell lines. Investig. Ophthalmol. Vis. Sci. 2003, 44, 496-506.
28. McCabe, K. L.; Kunzevitzky, N. J.; Chiswell, B. P.; Xia, X.; Goldberg, J. L.; Lanza, R. E_cient Generation of Human Embryonic Stem Cell-Derived Corneal Endothelial Cells by Directed Differentiation. PLoS ONE 2015, 10, 0145266.
29. Yu, Z.; Kastenmuller, G.; He, Y.; Belcredi, P.; Moller, G.; Prehn, C.; Mendes, J.; Wahl, S.; Roemisch-Margl, W.; Ceglarek, U.; et al. Di_erences between human plasma and serum metabolite profiles. PLoS ONE 2011, 6, e21230.
30. Wallace, A. M.; Sattar, N. The changing role of the clinical laboratory in the investigation of polycystic ovarian syndrome. Clin. Biochem. Rev. 2007, 28, 79-92.
31. Burger, L. L.; Haisenleder, D. J.; Dalkin, A. C.; Marshall, J. C. Regulation of gonadotropin subunit gene transcription. J. Mol. Endocrinol. 2004, 33, 559-584.
32. Truong, S.; Cole, N.; Stapleton, F.; Golebiowski, B. Sex hormones and the dry eye. Clin. Exp. Opt. 2014, 97, 324-336.
33. Versura, P.; Giannaccare, G.; Campos, E. C. Sex-steroid imbalance in females and dry eye. Curr. Eye Res. 2015, 40, 162-175.
34. Murube, J. Henrik Sjogren, 1899-1986. Ocul. Surf. 2010, 8, 2-7.
35. Mukhtar, S.; Ambati, B. K. Pediatric keratoconus: A review of the literature. Int. Ophthalmol. 2018, 38, 2257-2266.
36. Natarajan, R.; Ravindran, R. Progression of keratoconus resulting from hormone replacement therapy. J. Cataract Refract. Surg. 2019, 45, 1055.
37. Kahan, I. L.; Varsanyi-Nagy, M.; Toth, M.; Nadrai, A. The possible role of tear fluid thyroxine in keratoconus development. Exp. Eye Res. 1990, 50, 339-343.
38. Lee, R.; El-Massry, A.; El-Massry, Y.; Randleman, J. B. Bilateral, Asymmetric Keratoconus Induced by Thyrotoxicosis With Long-term Stability After Corneal Cross-linking. J. Refract. Surg. 2018, 34, 354-356.
39. Aydemir, O.; Naziroglu, M.; Colakoglu, N.; Yilmaz, T.; Kukner, A.; Kukner, A. S. Leptin in corneas from keratoconus and infectious keratitis patients. J. Ocul. Pharmacol. Ther. 2005, 21, 382-387.
40. Hajagos-Toth, J.; Ducza, E.; Samavati, R.; Vari, S. G.; Gaspar, R. Obesity in pregnancy: A novel concept on the roles of adipokines in uterine contractility. Croat. Med. J. 2017, 58, 96-104.
41. Sharif, R.; Bak-Nielsen, S.; Hjortdal, J.; Karamichos, D. Pathogenesis of Keratoconus: The intriguing therapeutic potential of Prolactin-inducible protein. Prog. Retinal Eye Res. 2018, 67, 150-167.

What is claimed is:

1. A method for treating a disease or condition of the eye related to a ratio of luteinizing hormone to follicle-stimulating hormone (LH/FSH ratio) comprising:
obtaining or having obtained a biological sample from a subject;
determining the LH/FSH ratio in the biological sample, wherein a decrease in the LH/FSH ratio when compared to an age-matched subject that does not have a disease or condition of the eye related to an LH/FSH ratio is indicative of a current or future disease or condition of the eye related to an LH/FSH ratio in the subject;
and administering to the subject with a decrease in the LH/FSH ratio an effective amount of gonadotropes, pituitary hormones, Gonadotropin-releasing hormones, LH, FSH, dehydroepiandrosterone sulfate (DHEA-S), Estrone, Estriol, or sex hormones, with a Prolactin-Inducible Protein (PIP) or a Gonadotropin-releasing hormone (GNRH) in an amount sufficient to increase the LH/FSH ratio.

2. The method of claim 1, wherein the disease or condition of the eye is Keratoconus; or is Keratoconus and a severity of Keratoconus is determined by measuring a decrease in the LH/FSH ratio for Keratoconus levels KC-1, KC-2, KC-3 and KC-4.

3. The method of claim 1, wherein a first biological sample is obtained at a first time that is before, during, or after puberty, and a second biological sample is obtained at a second time after the first time, wherein a decrease in the LH/FSH ratio between the first and second time is predictive of Keratoconus when the second sample is obtained prior to symptoms of Keratoconus.

4. The method of claim 1, wherein the biological sample is a blood, plasma, tear, intravitreal, blood-serum, hair, urine, aqueous humor, saliva or sweat sample.

5. The method of claim 1, further comprising detecting at least one of dehydroepiandrosterone (DHEA) or dehydroepiandrosterone sulfate (DHEA-S) in the biological sample, wherein an increase in DHEA or DHEA-S when compared to an age-matched subject is indicative of Keratoconus; or further comprising detecting in the biological sample at least one of estrone, estriol, or gonadotropin-releasing hormone, wherein a decrease of estrone, estriol, gonadotropin-releasing hormone, or combinations thereof when compared to an age-matched subject, is indicative of Keratoconus.

6. A method of treating a subject that will develop a disease or condition of the eye related to a ratio of luteinizing hormone to follicle-stimulating hormone (LH/FSH ratio) comprising:
obtaining or having obtained a biological sample from the subject;
determining a level of expression of LH and FSH in the biological sample;
calculating the LH/FSH ratio in the biological sample;
determining if there is a decrease in the LH/FSH ratio when compared to an age-matched subject that does not have a disease or condition of the eye related to an LH/FSH ratio, wherein a decrease in the LH/FSH ratio is indicative of a current or future disease or condition of the eye related to an LH/FSH ratio in need of treatment; and
administering to the subject with a decrease in the LH/FSH ratio an effective amount of gonadotropes, pituitary hormones, Gonadotropin-releasing hormones, LH, FSH, dehydroepiandrosterone sulfate (DHEA-S), Estrone, Estriol, or sex hormones, with a Prolactin-Inducible Protein (PIP) or a Gonadotropin-releasing hormone (GNRH) in an amount sufficient to increase the LH/FSH ratio.

7. The method of claim 6, wherein the disease or condition of the eye is Keratoconus; or is Keratoconus and a severity of Keratoconus is determined by measuring a decrease in the LH/FSH ratio for Keratoconus levels KC-1, KC-2, KC-3 and KC-4.

8. The method of claim 6, wherein a first biological sample is obtained at a first time that is before, during, or after puberty, and a second biological sample is obtained at a second time after the first time, wherein a decrease in the ratio of LH/FSH between the first and second time is predictive of Keratoconus, and the second sample is obtained prior to symptoms of Keratoconus.

9. The method of claim 6, wherein the biological sample is a blood, plasma, tear, intravitreal, blood-serum, hair, urine, aqueous humor, saliva or sweat sample.

10. The method of claim 6, further comprising detecting at least one of dehydroepiandrosterone (DHEA) or dehydroepiandrosterone sulfate (DHEA-S) in the biological sample, wherein an increase in DHEA or DHEA-S when compared to an age-matched subject is indicative of Keratoconus; or further comprising detecting in the biological sample at least one of estrone, estriol, or gonadotropin-releasing hormone, wherein a decrease of estrone, estriol, gonadotropin-releasing hormone, or combinations thereof when compared to an age-matched subject, is indicative of Keratoconus.

11. The method of claim 6, wherein an amount of a Prolactin-Inducible Protein (PIP) effective to treat the disease or condition of the eye is administered to the subject.

12. A method for treating a patient with a disease or condition of the eye related to a ratio of luteinizing hormone to follicle-stimulating hormone (LH/FSH ratio), the method comprising the steps of:
performing or having performed a determination of the LH/FSH ratio in a biological sample obtained from a patient suspected of having a disease or condition of the eye related to an LH/FSH ratio; and
administering to the subject with a decrease in the LH/FSH ratio as compared to an age-matched control that does not have a disease or condition of the eye related to an LH/FSH ratio, an effective amount of gonadotropes, pituitary hormones, Gonadotropin-releasing hormones, LH, FSH, dehydroepiandrosterone sulfate (DHEA-S), Estrone, Estriol, or sex hormones, with a Prolactin-Inducible Protein (PIP) or a Gonadotropin-releasing hormone (GNRH) in an amount sufficient to increase the LH/FSH ratio.

13. The method of claim 12, wherein the PIP is provided in an amount of 0.1 ng/ml to 1 mg/ml or the GNRH is provided in an amount of 0.1 pg/ml to 1 mg/ml.

14. The method of claim 12, wherein the disease or condition of the eye is Keratoconus; or is Keratoconus and a severity of Keratoconus is determined by measuring a decrease in the LH/FSH ratio for Keratoconus levels KC-1, KC-2, KC-3 and KC-4.

15. A method of treating a patient with Keratoconus comprising:
obtaining a sample of corneal stromal cells from a patient suspected of having Keratoconus;
determining a level of expression of luteinizing hormone receptor (LHR), follicle stimulating hormone receptor (FSHR), or both in the sample, wherein an increase in LHR, or a decrease of FHSR, or both as compared to an age matched subject that does not have keratoconus, is indicative of Keratoconus; and
administering to the patient with Keratoconus a composition comprising an effective amount of gonadotropes, pituitary hormones, Gonadotropin-releasing hormones, LH, FSH, dehydroepiandrosterone sulfate (DHEA-S), Estrone, Estriol, or sex hormones, and a Prolactin-Inducible Protein (PIP) or a Gonadotropin-releasing hormone (GNRH) in an amount sufficient to increase an LH/FSH ratio in the patient.

16. The method of claim 15, wherein the PIP is provided in an amount of 0.1 ng/ml to mg/ml or the GNRH is provided in an amount of 0.1 pg/ml to 1 mg/ml.

17. The method of claim 15, wherein the composition is formulated for topical, or ophthalmic.

18. The method of claim 17, wherein the composition is delivered into the conjunctival sac of the patient or administered to the patient by intravitreal, subconjunctival, retrobulbar, intracameral, or sub-Tenon's administration.

* * * * *